(12) United States Patent
Laghate et al.

(10) Patent No.: US 12,335,757 B2
(45) Date of Patent: Jun. 17, 2025

(54) TECHNIQUES FOR BEAM SELECTION USING CHANNEL STATE INFORMATION REFERENCE SIGNAL ACQUISITION RESOURCES

(71) Applicant: QUALCOMM Incorporated, San Diego, CA (US)

(72) Inventors: Mihir Vijay Laghate, San Diego, CA (US); Jun Zhu, San Diego, CA (US); Yongle Wu, San Diego, CA (US); Raghu Narayan Challa, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/687,450

(22) Filed: Mar. 4, 2022

(65) Prior Publication Data

US 2022/0286882 A1    Sep. 8, 2022

Related U.S. Application Data

(60) Provisional application No. 63/197,304, filed on Jun. 4, 2021, provisional application No. 63/158,347, filed on Mar. 8, 2021.

(51) Int. Cl.
*H04W 24/10* (2009.01)
*H04L 5/00* (2006.01)
(Continued)

(52) U.S. Cl.
CPC .......... *H04W 24/08* (2013.01); *H04L 5/0048* (2013.01); *H04W 24/10* (2013.01); *H04W 72/54* (2023.01)

(58) Field of Classification Search
None
See application file for complete search history.

(56) References Cited

U.S. PATENT DOCUMENTS 6,233,451 B1    5/2001 Noerpel et al.
8,411,656 B2    4/2013 Liu
(Continued)

FOREIGN PATENT DOCUMENTS

CN    106284643 B    6/2018
JP    6306692 B2    4/2018
(Continued)

OTHER PUBLICATIONS

ETSI TR 138 912, V14.0.0, "3rd Generation Partnership Project, Technical Specification Group Radio Access Network, Study on New Radio (NR) Access Technology (Release 14)", 3GPP Standard, Technical Specification, 3GPP TR 38.912, Mobile Competence Centre, 650, Route Des Lucioles, F-06921 Sophia-Antipolis Cedex, France, vol. TSG RAN, No. Mar. 24, 2017, XP051295707, 77 pages.

(Continued)

*Primary Examiner* — The Hy Nguyen
(74) *Attorney, Agent, or Firm* — Dalei Dong; Holland & Hart LLP

(57) ABSTRACT

Methods, systems, and devices for wireless communications are described. A user equipment (UE) may perform a set of synchronization signal block (SSB) measurements and select a serving UE beam and a set of candidate UE beams for measuring a channel state information (CSI) reference signal (CSI-RS) based on the set of SSB measurements. The UE may identify, or predict, time resources for the CSI-RS based on previous CSI-RS configurations. The UE may measure the CSI-RS based on the time resources using a candidate UE beam from the set of candidate UE beams. The UE may transmit, to an access network entity, a measure- (Continued)

ment report based on measuring the CSI-RS using the candidate UE beam or a last CSI-RS measurement on the serving UE beam.

25 Claims, 12 Drawing Sheets

(51) Int. Cl.
*H04W 24/08* (2009.01)
*H04W 72/54* (2023.01)

(56) References Cited

U.S. PATENT DOCUMENTS

| | | | |
|---|---|---|---|
| 8,558,552 | B2 | 10/2013 | Chappell et al. |
| 8,942,207 | B2 | 1/2015 | Son et al. |
| 9,560,561 | B2 | 1/2017 | Son et al. |
| 9,955,408 | B2 | 4/2018 | Novlan et al. |
| 10,158,173 | B2 | 12/2018 | Foo |
| 10,389,426 | B2 | 8/2019 | Rahman et al. |
| 10,411,773 | B2 | 9/2019 | Faxer et al. |
| 10,517,061 | B1 | 12/2019 | Kumar et al. |
| 10,608,715 | B2 | 3/2020 | Faxer et al. |
| 10,666,342 | B1 | 5/2020 | Landis et al. |
| 10,735,870 | B2 | 8/2020 | Ballande et al. |
| 10,798,588 | B2 | 10/2020 | Yu et al. |
| 10,925,062 | B2 | 2/2021 | Liu et al. |
| 10,972,162 | B2 | 4/2021 | Faxer et al. |
| 11,063,652 | B2 | 7/2021 | Xiong et al. |
| 11,121,751 | B2 | 9/2021 | Raghavan et al. |
| 2007/0213038 | A1 | 9/2007 | Masseroni et al. |
| 2007/0230639 | A1* | 10/2007 | Stirling-Gallacher ........................ H04B 7/0695 375/267 |
| 2014/0112194 | A1 | 4/2014 | Novlan et al. |
| 2016/0057770 | A1 | 2/2016 | Yerramalli et al. |
| 2017/0163296 | A1 | 6/2017 | Terry et al. |
| 2018/0103407 | A1 | 4/2018 | Nagaraja et al. |
| 2018/0124766 | A1 | 5/2018 | Nagaraja et al. |
| 2018/0176949 | A1 | 6/2018 | Islam et al. |
| 2018/0176958 | A1 | 6/2018 | Islam et al. |
| 2018/0227772 | A1 | 8/2018 | Yu et al. |
| 2018/0351611 | A1 | 12/2018 | Nagaraja et al. |
| 2018/0368142 | A1 | 12/2018 | Liou |
| 2019/0044578 | A1 | 2/2019 | Rao et al. |
| 2019/0082334 | A1 | 3/2019 | Nagaraja et al. |
| 2019/0174311 | A1 | 6/2019 | Hayashi et al. |
| 2019/0200365 | A1 | 6/2019 | Sampath et al. |
| 2019/0239135 | A1* | 8/2019 | Levitsky ............... H04L 5/0057 |
| 2019/0253117 | A1 | 8/2019 | Raghavan et al. |
| 2019/0268053 | A1 | 8/2019 | John Wilson et al. |
| 2019/0268060 | A1 | 8/2019 | Nam et al. |
| 2019/0305830 | A1 | 10/2019 | Zhou et al. |
| 2019/0349124 | A1* | 11/2019 | Tang ................... H04L 25/0226 |
| 2019/0380053 | A1 | 12/2019 | Bai et al. |
| 2020/0007216 | A1 | 1/2020 | Nasiri Khormuji et al. |
| 2020/0007219 | A1 | 1/2020 | Fellhauer et al. |
| 2020/0044716 | A1 | 2/2020 | Yilmaz et al. |
| 2020/0084735 | A1 | 3/2020 | Cheng et al. |
| 2020/0112926 | A1 | 4/2020 | Laghate et al. |
| 2020/0186229 | A1 | 6/2020 | Raghavan et al. |
| 2020/0196383 | A1 | 6/2020 | Tsai et al. |
| 2020/0220597 | A1 | 7/2020 | Rahman et al. |
| 2020/0252783 | A1 | 8/2020 | Novlan et al. |
| 2020/0288479 | A1 | 9/2020 | Xi et al. |
| 2020/0373988 | A1* | 11/2020 | Wang ..................... H04B 7/066 |
| 2020/0389852 | A1 | 12/2020 | Wang et al. |
| 2020/0396731 | A1 | 12/2020 | Venugopal et al. |
| 2021/0006986 | A1* | 1/2021 | Zhu ..................... H04B 7/06952 |
| 2021/0028847 | A1 | 1/2021 | Bedekar et al. |
| 2021/0067226 | A1* | 3/2021 | Nilsson ................. H04W 52/34 |
| 2021/0067229 | A1* | 3/2021 | Ryu ..................... H04W 80/02 |
| 2021/0068123 | A1 | 3/2021 | Zhu et al. |
| 2021/0099992 | A1 | 4/2021 | Mao et al. |
| 2021/0109145 | A1 | 4/2021 | Haustein et al. |
| 2021/0136741 | A1 | 5/2021 | Onggosanusi et al. |
| 2021/0168788 | A1 | 6/2021 | Liu et al. |
| 2021/0175953 | A1 | 6/2021 | Nilsson et al. |
| 2021/0194549 | A1 | 6/2021 | Faxer et al. |
| 2021/0195651 | A1 | 6/2021 | Zhang et al. |
| 2021/0204251 | A1 | 7/2021 | Laghate |
| 2021/0212051 | A1 | 7/2021 | Raghavan et al. |
| 2021/0235338 | A1 | 7/2021 | Zhang et al. |
| 2021/0242989 | A1 | 8/2021 | Levitsky et al. |
| 2021/0258800 | A1 | 8/2021 | Yang et al. |
| 2022/0094497 | A1* | 3/2022 | Shibaike ............... H04L 1/0027 |
| 2022/0117031 | A1* | 4/2022 | Guo .................. H04W 72/0446 |
| 2022/0140886 | A1 | 5/2022 | Lau |
| 2022/0224476 | A1* | 7/2022 | Noh ..................... H04L 5/0048 |
| 2024/0080680 | A1 | 3/2024 | Zhu et al. |

FOREIGN PATENT DOCUMENTS

| | | |
|---|---|---|
| WO | WO-2018029952 A1 | 2/2018 |
| WO | WO-2019190538 A1 | 10/2019 |
| WO | WO-2019243449 A2 | 12/2019 |
| WO | WO-2020026454 A1 | 2/2020 |
| WO | WO-2020096903 A1 | 5/2020 |
| WO | WO-2020118480 A1 | 6/2020 |
| WO | WO-2020119597 A1 | 6/2020 |
| WO | WO-2020226471 A1 | 11/2020 |
| WO | WO-2021047760 A1 | 3/2021 |
| WO | WO-2022093490 A1 | 5/2022 |

OTHER PUBLICATIONS

Wikipedia: Dither, last updated Aug. 24, 2021, 9 pages.
Partial International Search Report—PCT/US2022/019097—ISA/EPO—Jun. 14, 2022.
International Search Report and Written Opinion—PCT/US2022/019097—ISA/EPO—Aug. 4, 2022.

* cited by examiner

TECHNIQUES FOR BEAM SELECTION USING CHANNEL STATE INFORMATION REFERENCE SIGNAL ACQUISITION RESOURCES

CROSS REFERENCE

The present Application for Patent claims the benefit of U.S. Provisional Patent Application No. 63/158,347 by LAGHATE et al., entitled "TECHNIQUES FOR BEAM SELECTION USING CHANNEL STATE INFORMATION REFERENCE SIGNAL ACQUISITION RESOURCES," filed Mar. 8, 2021, and the benefit of U.S. Provisional Patent Application No. 63/197,304 by LAGHATE et al., entitled "TECHNIQUES FOR BEAM SELECTION USING CHANNEL STATE INFORMATION REFERENCE SIGNAL ACQUISITION RESOURCES," filed Jun. 4, 2021, each of which is assigned to the assignee hereof, and each of which is expressly incorporated by reference herein.

FIELD OF TECHNOLOGY

The following relates to wireless communications, including techniques for beam selection using channel state information reference signal acquisition resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support beam selection using channel state information (CSI) reference signal (CSI-RS) acquisition resources. The described techniques provide for switching to a candidate UE beam to measure a CSI-RS. A user equipment (UE) may measure synchronization signal blocks (SSBs) using multiple UE beams and select a beam as a serving UE beam based on the measurements. The UE may be configured to measure CSI-RS using non-serving or candidate UE beams. For example, the UE may identify a list of candidate UE beams to measure on a CSI-RS resource which may be used for cell acquisition. The list of candidate UE beams may be based on, or identified from, a set of beams used to perform the SSB measurements.

The UE may identify a slot and symbol where resources for the CSI-RS for acquisition will be scheduled. In some cases, the UE may predict time resources for the CSI-RS in order to switch to the candidate UE beam and measure the CSI-RS. For example, the UE may estimate a slot and symbol for the CSI-RS based on past scheduled aperiodic CSI-RS resources, switch to the candidate UE beam for the predicted time resources and measure the CSI-RS using the candidate UE beam. This may enable the UE to measure the CSI-RS using a candidate UE beam without waiting to process downlink control information that indicates where the CSI-RS is in a slot, if present. In some cases, the UE may schedule a candidate UE beam for an entire slot when scheduling the candidate UE beam to measure the CSI-RS. In some cases, the UE may use the same beam for multiple slots in a time window around a predicted slot, which may further increase a likelihood of measuring the CSI-RS using the candidate UE beam. The UE may measure spectral efficiency on the resource carrying the CSI-RS and prepare and send a report to an access network entity, such as a base station, including either a last measurement on the serving UE beam or a recent measurement of a candidate UE beam. The UE or the access network entity, or both, may process the measured spectral efficiency for serving beam selection.

A method for wireless communication at a UE is described. The method may include performing a set of synchronization signal block measurements, selecting a serving UE beam and a set of candidate UE beams for measuring a CSI-RS based on the set of synchronization signal block measurements, identifying a set of time resources for the CSI-RS based on one or more previous CSI-RS configurations, measuring the CSI-RS based on the set of time resources using a candidate UE beam from the set of candidate UE beams, and transmitting, to an access network entity, a measurement report based on measuring the CSI-RS using the candidate UE beam or a last CSI-RS measurement on the serving UE beam, or both.

An apparatus for wireless communication at a UE is described. The apparatus may include a processor, memory coupled with the processor, and instructions stored in the memory. The instructions may be executable by the processor to cause the apparatus to perform a set of synchronization signal block measurements, select a serving UE beam and a set of candidate UE beams for measuring a CSI-RS based on the set of synchronization signal block measurements, identify a set of time resources for the CSI-RS based on one or more previous CSI-RS configurations, measure the CSI-RS based on the set of time resources using a candidate UE beam from the set of candidate UE beams, and transmit, to an access network entity, a measurement report based on measuring the CSI-RS using the candidate UE beam or a last CSI-RS measurement on the serving UE beam, or both.

Another apparatus for wireless communication at a UE is described. The apparatus may include means for performing a set of synchronization signal block measurements, means for selecting a serving UE beam and a set of candidate UE beams for measuring a CSI-RS based on the set of synchronization signal block measurements, means for identifying a set of time resources for the CSI-RS based on one or more previous CSI-RS configurations, means for measuring the CSI-RS based on the set of time resources using a candidate UE beam from the set of candidate UE beams, and means for transmitting, to an access network entity, a measurement report based on measuring the CSI-RS using the candidate UE beam or a last CSI-RS measurement on the serving UE beam, or both.

A non-transitory computer-readable medium storing code for wireless communication at a UE is described. The code may include instructions executable by a processor to perform a set of synchronization signal block measurements, select a serving UE beam and a set of candidate UE beams for measuring a CSI-RS based on the set of synchronization signal block measurements, identify a set of time resources for the CSI-RS based on one or more previous CSI-RS configurations, measure the CSI-RS based on the set of time resources using a candidate UE beam from the set of candidate UE beams, and transmit, to an access network entity, a measurement report based on measuring the CSI-RS using the candidate UE beam or a last CSI-RS measurement on the serving UE beam, or both.

In some examples of the method, apparatuses, and non-transitory computer-readable medium described herein, identifying the set of time resources may include operations, features, means, or instructions for predicting the set of time resources based on the one or more previous CSI-RS configurations.

Some examples of the method, apparatuses, and non-transitory computer-readable medium described herein may further include operations, features, means, or instructions for determining a slot format for a slot including the set of time resources, where the slot format includes at least one downlink shared channel resource and monitoring the slot using the candidate UE beam based on determining the slot format, where the CSI-RS may be measured based on monitoring the slot.

Some examples of the method, apparatuses, and non-transitory computer-readable medium described herein may further include operations, features, means, or instructions for measuring a demodulation reference signal on the at least one downlink shared channel resource using the candidate UE beam and performing channel estimation for the slot based on measuring the demodulation reference signal.

Some examples of the method, apparatuses, and non-transitory computer-readable medium described herein may further include operations, features, means, or instructions for using the candidate UE beam for a set of multiple slots based on a time window around the set of time resources, where the CSI-RS may be measured during at least a symbol in the set of multiple slots.

Some examples of the method, apparatuses, and non-transitory computer-readable medium described herein may further include operations, features, means, or instructions for determining a scheduling variation for the access network entity, where the candidate UE beam may be used for the set of multiple slots based on the scheduling variation.

In some examples of the method, apparatuses, and non-transitory computer-readable medium described herein, using the candidate UE beam for the set of multiple slots may include operations, features, means, or instructions for using the candidate UE beam for uplink communications and downlink communications during the set of multiple slots.

Some examples of the method, apparatuses, and non-transitory computer-readable medium described herein may further include operations, features, means, or instructions for monitoring a slot including the set of time resources using the candidate UE beam, where the CSI-RS resource may be measured on a different symbol of the slot than a predicted symbol for the CSI-RS of the set of time resources.

In some examples of the method, apparatuses, and non-transitory computer-readable medium described herein, identifying the set of time resources may include operations, features, means, or instructions for identifying an aperiodic reference signal resource configuration from the one or more previous CSI-RS configurations and determining scheduling information for the one or more previous channel state information measurements based on the aperiodic reference signal resource configuration, where the set of time resources may be identified based on the scheduling information.

In some examples of the method, apparatuses, and non-transitory computer-readable medium described herein, measuring the CSI-RS may include operations, features, means, or instructions for measuring a spectral efficiency using the candidate UE beam based on the CSI-RS, where the measurement report may be generated based on the spectral efficiency.

Some examples of the method, apparatuses, and non-transitory computer-readable medium described herein may further include operations, features, means, or instructions for measuring the spectral efficiency separately for each rank of the candidate UE beam.

Some examples of the method, apparatuses, and non-transitory computer-readable medium described herein may further include operations, features, means, or instructions for updating the set of candidate UE beams based on measuring the CSI-RS, additional synchronization signal block measurements, one or more CSI-RS measurements using one or more additional candidate UE beams, or any combination thereof.

Some examples of the method, apparatuses, and non-transitory computer-readable medium described herein may further include operations, features, means, or instructions for reselecting the serving UE beam based on measuring the channel state information reference signal.

In some examples of the method, apparatuses, and non-transitory computer-readable medium described herein, identifying the set of candidate UE beams may include operations, features, means, or instructions for performing a filtering, a biasing, a thresholding, or any combination thereof, for a first rank and a second rank of a measurement of the channel state information reference signal, where reselection of the serving beam is based on the filtering, the biasing, the thresholding, or any combination thereof.

In some examples of the method, apparatuses, and non-transitory computer-readable medium described herein, identifying the set of candidate UE beams may include operations, features, means, or instructions for identifying the set of candidate UE beams from a subset of beams used for the set of synchronization signal block measurements.

In some examples of the method, apparatuses, and non-transitory computer-readable medium described herein, the set of candidate UE beams may be identified based on a reference signal received power measurement of the subset of beams used for the set of synchronization signal block measurements.

In some examples of the method, apparatuses, and non-transitory computer-readable medium described herein, the set of candidate UE beams may be identified based on a channel impulse response measurement of the subset of beams used for the set of synchronization signal block measurements.

In some examples of the method, apparatuses, and non-transitory computer-readable medium described herein, the set of candidate UE beams may be identified based on an uplink link budget of the UE.

In some examples of the method, apparatuses, and non-transitory computer-readable medium described herein, the CSI-RS may be an acquisition CSI-RS.

A method for wireless communication at a user equipment (UE) is described. The method may include performing a set of synchronization signal block measurements, selecting a serving UE beam and a set of candidate UE beams for measuring a channel state information reference signal based on the set of synchronization signal block measurements, receiving a threshold number of downlink grants with a demodulation reference signal using the serving UE beam, monitoring one or more wireless channels of a slot using a candidate UE beam from the set of candidate UE beams based on receiving the threshold number of downlink grants, measuring one or more demodulation reference signals transmitted over the one or more wireless channels of the slot using the candidate UE beam, and transmitting, to an access network entity, a measurement report based on measuring the one or more demodulation reference signals using the candidate UE beam or a last channel state information reference signal measurement on the serving UE beam, or both.

An apparatus for wireless communication at a UE is described. The apparatus may include a processor, memory coupled with the processor, and instructions stored in the memory. The instructions may be executable by the processor to cause the apparatus to perform a set of synchronization signal block measurements, select a serving UE beam and a set of candidate UE beams for measuring a channel state information reference signal based on the set of synchronization signal block measurements, receive a threshold number of downlink grants with a demodulation reference signal using the serving UE beam, monitor one or more wireless channels of a slot using a candidate UE beam from the set of candidate UE beams based on receiving the threshold number of downlink grants, measure one or more demodulation reference signals transmitted over the one or more wireless channels of the slot using the candidate UE beam, and transmit, to an access network entity, a measurement report based on measuring the one or more demodulation reference signals using the candidate UE beam or a last channel state information reference signal measurement on the serving UE beam, or both.

Another apparatus for wireless communication at a UE is described. The apparatus may include means for performing a set of synchronization signal block measurements, means for selecting a serving UE beam and a set of candidate UE beams for measuring a channel state information reference signal based on the set of synchronization signal block measurements, means for receiving a threshold number of downlink grants with a demodulation reference signal using the serving UE beam, means for monitoring one or more wireless channels of a slot using a candidate UE beam from the set of candidate UE beams based on receiving the threshold number of downlink grants, means for measuring one or more demodulation reference signals transmitted over the one or more wireless channels of the slot using the candidate UE beam, and means for transmitting, to an access network entity, a measurement report based on measuring the one or more demodulation reference signals using the candidate UE beam or a last channel state information reference signal measurement on the serving UE beam, or both.

A non-transitory computer-readable medium storing code for wireless communication at a UE is described. The code may include instructions executable by a processor to perform a set of synchronization signal block measurements, select a serving UE beam and a set of candidate UE beams for measuring a channel state information reference signal based on the set of synchronization signal block measurements, receive a threshold number of downlink grants with a demodulation reference signal using the serving UE beam, monitor one or more wireless channels of a slot using a candidate UE beam from the set of candidate UE beams based on receiving the threshold number of downlink grants, measure one or more demodulation reference signals transmitted over the one or more wireless channels of the slot using the candidate UE beam, and transmit, to an access network entity, a measurement report based on measuring the one or more demodulation reference signals using the candidate UE beam or a last channel state information reference signal measurement on the serving UE beam, or both.

In some examples of the method, apparatuses, and non-transitory computer-readable medium described herein, measuring the channel state information reference signal may include operations, features, means, or instructions for measuring a spectral efficiency or a signal-to-noise ratio, or both, using the candidate UE beam based on the one or more demodulation reference signals, where the measurement report may be generated based on the spectral efficiency or the signal-to-noise ratio, or both.

DETAILED DESCRIPTION

Figure 1:
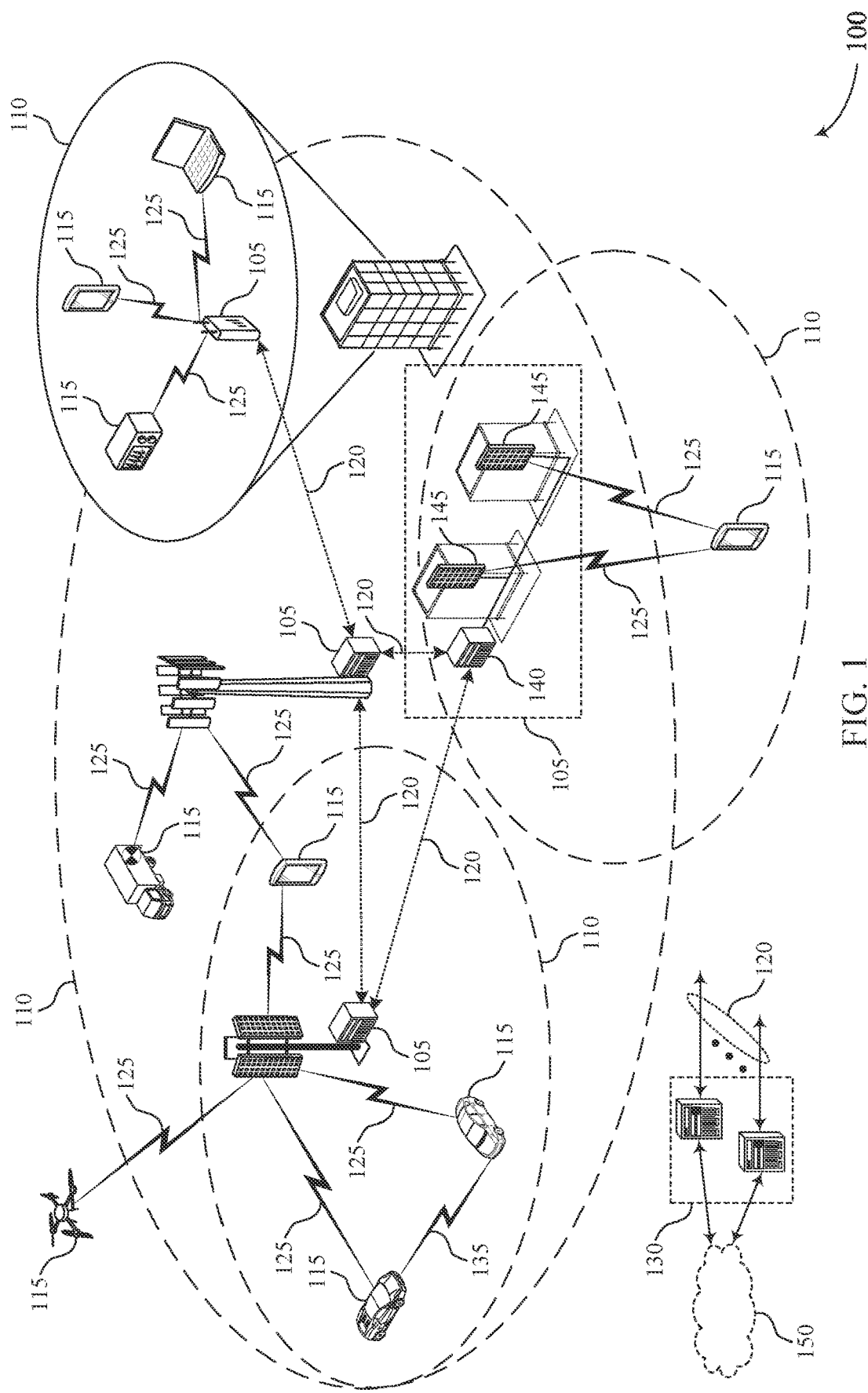
FIG. 1 illustrates an example of a wireless communications system that supports techniques for beam selection using channel state information (CSI) reference signal (CSI-RS) acquisition resources in accordance with aspects of the present disclosure.

A wireless communications system may support beamformed communications. For example, an access network entity, such as a base station, may communicate with a user equipment (UE) using one or more base station beams, and the UE may communicate with the base station using one or more UE beams. The UE may measure synchronization signal blocks (SSBs) using multiple UE beams and select a beam as a serving UE beam based on the measurements. The UE may be configured to measure channel state information (CSI) reference signals (CSI-RS) using candidate UE beams. The CSI-RS may be CSI-RS which are used for cell acquisition. For example, the UE may identify a list of candidate UE beams to measure on a CSI-RS resource used for acquisition. The list of candidate UE beams may be based on, or identified from, a set of beams used for serving SSB measurements. In some cases, a set of UE beams may be selected as candidate UE beams based on having a high reference signal received power (RSRP) measurement, high channel impulse response measurement, or both.

The UE may identify a slot and symbol where resources for the CSI-RS for acquisition will be scheduled. In some wireless communications systems, a UE may identify the slot and symbol with CSI-RS based on downlink control information on a physical downlink control channel (PDCCH) earlier in the slot. However, this may not provide enough time to both process the PDCCH indicating the CSI-RS and switch to a candidate UE beam (e.g., from the serving UE beam) before the time resources for the CSI-RS. Therefore, a UE described herein may implement techniques to predict time resources for the CSI-RS to support measuring CSI-RS using a candidate UE beam. For example, the UE may estimate a slot and symbol for the CSI-RS based on past scheduled aperiodic CSI-RS resources, switch to the candidate UE beam for the predicted time resources, and measure the CSI-RS using the candidate UE beam.

The UE may schedule either a candidate UE beam or the serving UE beam for at least the identified symbol during the identified slot. This may enable the UE to measure the CSI-RS using a candidate UE beam without waiting to process the PDCCH. In some cases, the UE may schedule a candidate UE beam for an entire slot when scheduling the candidate UE beam to measure the CSI-RS. Using the candidate UE beam for the entire slot may increase a likelihood of correctly predicting the time resources for the CSI-RS. In some examples, a physical downlink shared channel (PDSCH) may be multiplexed with the CSI-RS. Using the same beam throughout the slot may provide better channel estimation using demodulation reference signals (DMRS) on the PDSCH. In some cases, the UE may use the same beam for multiple slots in a time window around a predicted slot, which may further increase a likelihood of measuring the CSI-RS using the candidate UE beam.

The UE may measure spectral efficiency on the resource carrying the CSI-RS. In some cases, spectral efficiency may be measured for each rank separately. The UE may prepare a report to base station including either a last measurement on the serving UE beam or a recent measurement of a candidate UE beam. In some cases, the report may be generated based on, or include information for, both a recent measurement for the serving UE beam and measurements for one or more candidate UE beams. The UE may transmit the report to the base station. The UE or the base station, or both, may process the measured spectral efficiency for serving beam selection.

Aspects of the disclosure are initially described in the context of wireless communications systems. Aspects of the disclosure are further illustrated by and described with reference to apparatus diagrams, system diagrams, and flowcharts that relate to techniques for beam selection using CSI-RS acquisition resources.

FIG. 1 illustrates an example of a wireless communications system 100 that supports techniques for beam selection using CSI-RS acquisition resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support beamformed communications. For example, a base station 105 may communicate with a UE 115 using one or more base station beams, and the UE 115 may communicate with the base station 105 using one or more UE beams.

The wireless communications system 100 may use a CSI-RS for one or more types of measurements. For example, a CSI-RS, such as a non-zero power (NZP) CSI-RS, may be used for cell acquisition, tracking (e.g., a tracking reference signal (TRS)), or beam management. In some cases, fields of a CSI-RS or configured resources for the CSI-RS may be based on how the CSI-RS is used (e.g., acquisition, tracking, or beam management). A CSI-RS for acquisition may be configured without a tracking or repetition field and may be used for channel state feedback (CSF) to optimize downlink throughput by link adaptation. A CSI-RS for tracking, or a TRS, may be configured with a tracking field and may be designed for a UE 115 to update timing and frequency tracking loops. A CSI-RS for beam management may be configured with a repetition field and without a tracking field. If the repetition field is set to false, the CSI-RS may be a CSI-RS P2 resource. The CSI-RS P2 resource may be used for gNB beam refinement. A UE 115 may measure the RSRP of the CSI-RS P2 and report the RSRP back to the network for beam refinement. If the repetition field is set to true, the CSI-RS may be a CSI-RS P3 resource and designed for UE beam refinement.

In some cases, a UE 115 may measure synchronization signal blocks (SSBs) using multiple UE beams and select a beam as a serving UE beam based on the measurements. An SSB may be a rank-1 periodic reference signal. In some cases, an SSB may include one or more periodic reference signals, such as a primary synchronization signal (PSS), a secondary synchronization signal (SSS), and a physical broadcast channel (PBCH). In some cases, based on the rank-1 characteristic of the SSB, the SSB may not be used to optimize rank-2 performance for UE beam selection. Some networks may perform beam selection based on a CSI-RS P3.

In some cases, the CSI-RS may be quasi co-located (QCLed) to serving SSBs or aperiodic CSI-RS configuration. A UE 115 may sweep candidate UE beams (e.g., if the channel is stationary) over time and report CSF from the measurements. The UE 115 may update CSF based on DMRS and performing channel estimation. In some examples, the CSI-RS may be QCLed to non-serving SSBs. For periodic CSI-RS, the UE 115 may sweep UE beams on CSI-RS QCLed to the non-serving SSBs. These techniques may provide improved throughput, as SSB beam management may not be able to provide or predict Rank2 throughput.

However, some of these techniques may still present some challenges. For example, a CSF estimate from SSB or TRS channel estimation may not be possible or may not provide Rank-2 estimation since SSB and TRS are Rank-1 signals. In some cases, an aperiodic CSI-RS may be scheduled in the same slot as PDCCH, such that a UE 115 cannot physically switch in time to receive the CSI-RS based on processing the PDCCH in the same slot. Some techniques described herein may be implemented to ameliorate these challenges.

For example, a UE 115 may predict a slot and symbol where the CSI-RS is scheduled. For example, the UE 115 may predict the slot and symbol based on previous aperiodic CSI-RS configurations or scheduling. This may enable the UE 115 to switch UE beams in time for the CSI-RS, even without finishing processing a PDCCH in the same slot which indicates the CSI-RS resource. Some techniques are described for using the candidate UE beam for one or more slots to avoid possible scheduling variations or incorrect predictions based on scheduling variations.

The wireless communications system 100 may implement techniques to use CSI-RS for beam dithering. For example, a UE 115 may identify a set of candidate UE beams based on SSB measurements or past CSI-RS measurements. The UE 115 may predict a slot and symbol which may be used for a CSI-RS for acquisition based on previously scheduled aperiodic resources or previous CSI-RS configurations. The UE 115 may measure the acquisition CSI-RS using one or more candidate UE beams and determine a spectral efficiency on the resource. The UE 115 may report CSF for the candidate UE beam based on the measurement using the candidate UE beam. In some cases, the UE 115 or the network, or both, may process the measured spectral efficiency for serving beam selection purposes, such as when selecting or reselecting a serving beam for the UE 115.

Figure 2:
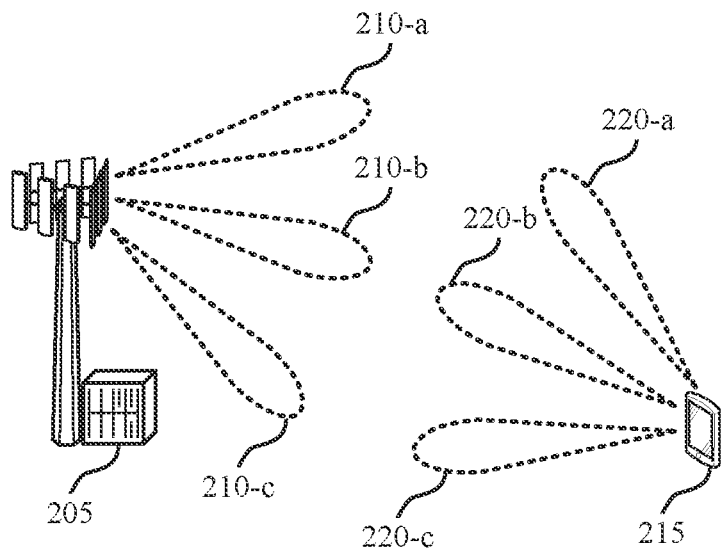
FIG. 2 illustrates an example of a wireless communications system that supports techniques for beam selection using CSI-RS acquisition resources in accordance with aspects of the present disclosure.

FIG. 2 illustrates an example of a wireless communications system 200 that supports techniques for beam selection using CSI-RS acquisition resources in accordance with aspects of the present disclosure. The wireless communications system 200 may implement aspects of or be an example of a wireless communications system 100. The wireless communication system 200 may include a UE 215 and a base station 205, which may be respective examples of a UE 115 and a base station 105 as described with reference to FIG. 1. In some examples, the base station 205 may be an example of a network entity, an access network entity, or a network node described herein.

The wireless communications system 200 may support beamformed communications. For example, the base station 205 may communicate with the UE 215 using one or more base station beams 210, and the UE 215 may communicate with the base station 205 using one or more UE beams 220.

For example, the base station beams 210 may include a base station beam 210-*a*, a base station beam 210-*b*, and a base station beam 210-*c*.

The UE 215 may measure SSBs using multiple UE beams 220 and select a beam as a serving UE beam based on the measurements. For example, the UE 215 may measure SSBs using at least a UE beam 220-*a*, a UE beam 220-*b*, and a UE beam 220-*c*. In an example, the UE 215 may select the UE beam 220-*b* as a serving UE beam based on the UE beam 220-*b* having a highest RSRP measurement on the corresponding SSB. A serving UE beam may, for example, be used to receive or transmit on PDCCH, PDCCH, a physical uplink control channel (PUCCH), a physical uplink shared channel (PUSCH), or a random access channel (RACH) message (e.g., RACH message 3), or any combination thereof. For example, the serving UE beam may be selected for control or data signaling to or from the base station 205.

The UE 215 may be configured to measure CSI-RS for acquisition using candidate UE beams. In some cases, the UE 215 may receive control signaling from the base station 205 configuring the UE 215 to measure the CSI-RS for acquisition using the candidate UE beams. For example, the UE 215 may identify a list of candidate UE beams to measure on a CSI-RS resource used for acquisition. The list of candidate UE beams may be based on, or identified from, a set of beams used for serving SSB measurements. For example, a top K beams from SSB measurements may be included in the list of candidate UE beams. In some cases, the top K beams may be determined based on highest RSRP measurements, channel impulse response measurements, or both. Additionally, or alternatively, the top K beams may be identified based on previous CSI-RS measurements. For example, the UE 215 may update or select the set of candidate UE beams based on previous CSI-RS measurements using previous serving UE beams or previous candidate UE beams.

In some examples, the UE 215 may identify the candidate beams based on an uplink link budget for the UE 215. For example, the UE 215 may estimate the uplink link budget based on a maximum permissible exposure (MPE) limit. The MPE limit may restrict some mmW transmissions or restrict the power of mmW transmissions in the wireless communications system 200. In some cases, the UE 215 may determine a virtual power headroom based on the MPE limit and select beams which may be closest to the virtual power headroom to measure the strongest beams within the MPE limit. In some cases, the virtual power headroom may be different from an actual power headroom for the UE 215.

The UE 215 may identify a slot and symbol where resources for the CSI-RS for acquisition will be scheduled. In some wireless communications systems, a UE 115 may identify the slot and symbol based on PDCCH in a same slot as the resources for the CSI-RS. However, the UE 115 in these systems may not have sufficient time to both process the PDCCH indicating the CSI-RS and switch to a candidate UE beam (e.g., from the serving UE beam).

The UE 215 may implement techniques to predict the slot and symbol of the resources for the CSI-RS to support measuring CSI-RS for acquisition using candidate UE beams. For example, the UE 215 may estimate a slot or symbol, or both, for the CSI-RS based on past scheduled aperiodic resources or CSI-RS configurations, or both. The UE 215 may schedule either a candidate UE beam (e.g., the UE beam 220-*a* or the UE beam 220-*c*) or the serving UE beam (e.g., the UE beam 220-*b*) for at least the identified symbol during the identified slot. This may enable the UE 215 to measure the CSI-RS using the candidate UE beam without waiting to process the PDCCH, as the resources carrying the CSI-RS may have already occurred once the PDCCH is processed.

In some cases, the UE 215 may schedule a UE beam 220 for the entire slot when scheduling the UE beam 220 for the CSI-RS symbol. In some examples, there may be PDCCH and PDSCH in the same slot. The PDSCH may be frequency division multiplexed on the same symbol as CSI-RS. Using the same beam throughout the slot may provide better channel estimation using the PDSCH DMRS which may be on another symbol of the same slot. If the CSI-RS slot prediction is inaccurate (e.g., due to scheduling variations at base station 205), then the UE 215 may use the same beam for multiple slots in a time window around the predicted slot. Some techniques for predicting symbols, slots, or both, are described in more detail with reference to FIG. 3.

The UE 215 may measure spectral efficiency on the resource carrying the CSI-RS used for acquisition. In some cases, spectral efficiency may be measured for each rank separately. In some cases, the UE 215 may perform filtering, biasing, or thresholding for a first rank and a second rank of the CSI-RS measurement.

The UE 215 may prepare a report to base station 205 including either a last measurement on the serving UE beam (e.g., the UE beam 220-*b*) or a recent measurement of a candidate UE beam (e.g., the UE beam 220-*a* or the UE beam 220-*c*). In some cases, the report may be generated based on, or include information for, both a recent measurement for the serving UE beam and measurements for one or more candidate UE beams. The UE 215 may then transmit the report to the base station 205. The UE 215 or the base station 205, or both, may process the measured spectral efficiency for serving beam selection. In some cases, the measured spectral efficiency may be processed to update or reselect a serving UE beam. In some examples, the base station 205 may update a base station beam 210 or update a configuration for a beam pair link based on the measured spectral efficiency.

In some examples, the UE 215 may sweep UE beams 220 to measure CSI-RS with different UE candidate beams over multiple occasions. For example, at a first occasion, the UE 215 may measure a first CSI-RS using UE beam 220-*a* (e.g., a candidate UE beam), then measure a second CSI-RS using UE beam 220-*b* (e.g., the serving UE beam), then measure a third CSI-RS using UE beam 220-*c* (e.g., another candidate UE beam). These techniques may provide enhanced beam selection, which may lead to selecting stronger beams and greater throughput.

In some examples described herein, the CSI-RS may be a CSI-RS which is used for cell acquisition. For example, the CSI-RS may not include tracking or repetition fields. The CSI-RS may be used for channel state feedback to optimize downlink throughput by link adaptation. In some cases, the CSI-RS resources may be configured or selected based on the CSI-RS being used for acquisition.

Some slots may include DMRS resources, which may be used to aperiodically transmit downlink data grants. Downlink grants may be aperiodically transmitted, as the scheduled data may often be aperiodic. The network may indicate a presence of PDSCH and DMRS symbols through downlink control information on a PDCCH symbol K0 slots before the PDSCH. Some systems may use K0=0, where the PDCCH resources and the PDSCH resources are in a same slot. Information for the PDSCH and DMRS may be indicated by the scheduling downlink control information. In some cases, if a PDSCH grant is rank-2, then the DMRS may also be rank-2.

In some examples, similar techniques may be used to sweep UE beams 220 on PDSCH slots and measure spectral efficiency or SNR on DMRS transmitted during the PDSCH slots. For example, the UE 215 may identify a set of candidate beams and select a serving UE beam. The UE 215 may count a number of downlink grants with DMRS and switch from the serving UE beam to a candidate UE beam after reaching a threshold number of downlink grants with DMRS. In some cases, the UE 215 may switch to the candidate UE beam for all channels of one or more slots. The UE 215 may perform SNR or spectral efficiency measurements based on the DMRS received using the candidate UE beam. The UE 215 may then transmit a measurement report to the base station 205 indicate either a measurement based on a last DMRS (e.g., a last SNR or spectral efficiency measurement) received using the UE serving beam or one or more measurements based on a DMRS received using the candidate UE beam, or both. In some cases, some techniques or aspects for using a candidate UE beam to measure CSI-RS may be implemented to measure DMRS using a candidate UE beam.

Figure 3:
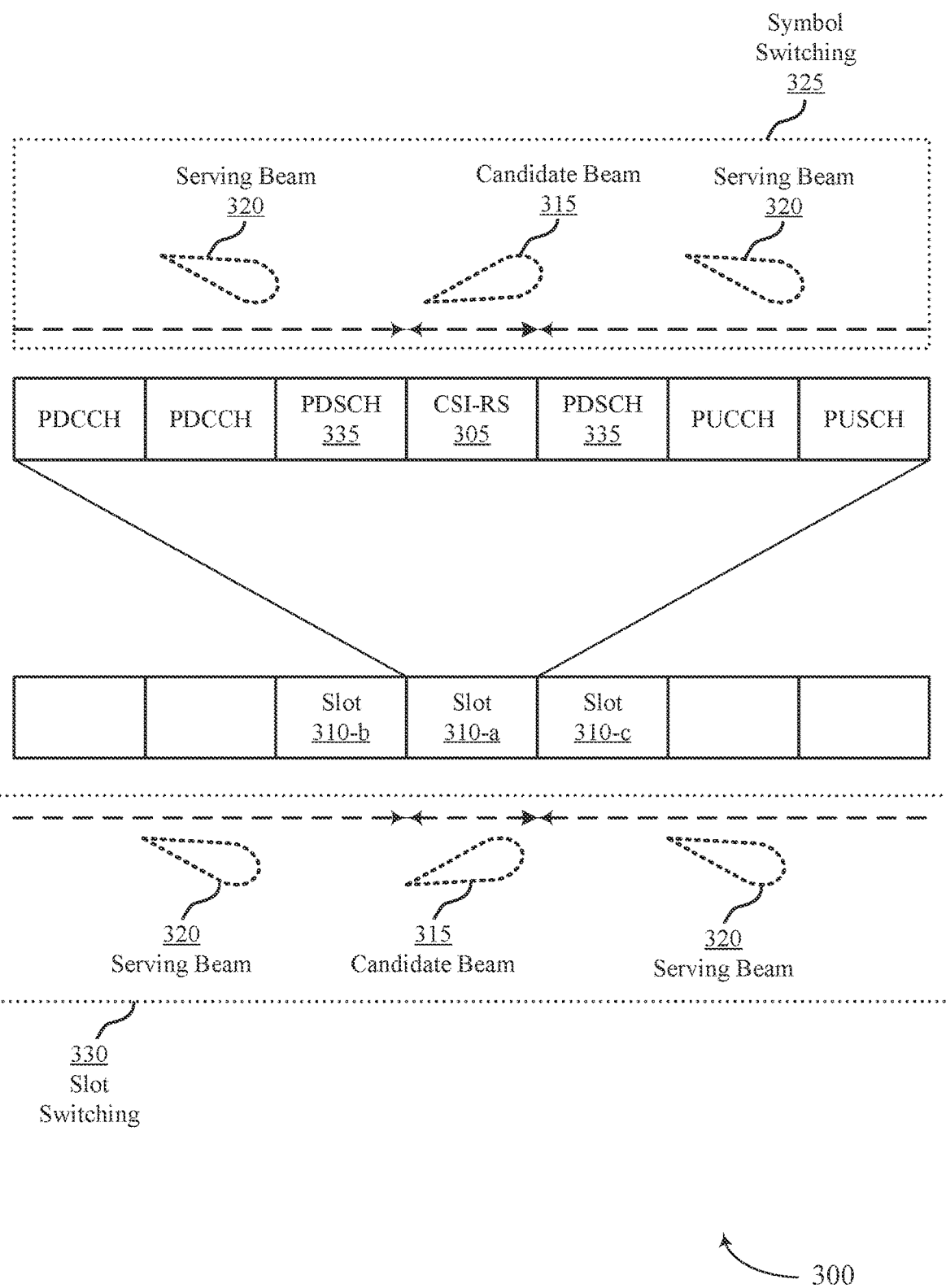
FIG. 3 illustrates an example of a beam scheduling technique that supports techniques for beam selection using CSI-RS acquisition resources in accordance with aspects of the present disclosure.

FIG. 3 illustrates an example of a beam scheduling technique 300 that supports techniques for beam selection using CSI-RS acquisition resources in accordance with aspects of the present disclosure. The beam scheduling technique 300 may be implemented by a UE 115, a base station 105, an access network entity, or any combination thereof, as described with reference to FIGS. 1 and 2.

A UE 115 may measure a CSI-RS 305 in a slot 310 using a candidate UE beam 315. The CSI-RS 305 may be an example of a CSI-RS used for acquisition, and the UE 115 may measure the CSI-RS 305 using a candidate UE beam 315 for enhanced beam selection techniques.

To measure the CSI-RS 305, the UE 115 may identify a slot 310 and symbol where resources for the CSI-RS 305 will be scheduled. In some wireless communications systems, the CSI-RS resources may be indicated or scheduled according to downlink control information included in PDCCH in a same slot 310 as the scheduled resources for the CSI-RS. For example, the PDCCH resources in the first or second symbol of slot 310-a may indicate resources for the CSI-RS 305.

Devices described herein may implement techniques to support switching to a candidate UE beam 315 (e.g., from a serving UE beam 320) to measure the CSI-RS 305 by predicting the scheduling for the CSI-RS 305. By implementing these techniques, the UE 115 may perform the switch before the PDCCH has finished processing and with sufficient time to finish the switching and measure the CSI-RS 305. For example, the UE 115 may estimate or predict a slot 310 or symbol, or both, for the CSI-RS 305 based on past scheduled aperiodic resources or CSI-RS configurations, or both. This may enable the UE 115 to measure the CSI-RS 305 using the candidate UE beam 315 without waiting to process the PDCCH, as the resources carrying the CSI-RS 305 may have already occurred once the PDCCH is processed.

The UE 115 may implement a symbol-based switching 325 or a slot-based switching 330, or both. The UE 115 may schedule the candidate UE beam 315 for at least the identified symbol during the identified slot 310. For the symbol-based switching 325, the UE 115 may switch from the serving UE beam 320 to the candidate UE beam 315 for the CSI-RS 305 but use the serving UE beam 320 for other symbols in the slot 310. For example, the UE 115 may use the serving UE beam 320 for PDCCH, PDSCH 335, and PUSCH in the slot 310-a, and the UE 115 may use the candidate UE beam 315 for the CSI-RS 305.

For the slot-based switching 330, the UE 115 may schedule at least a whole slot including the CSI-RS 305 to use the candidate UE beam 315. In a first example, the UE 115 may schedule all of the slot 310-a to use the candidate UE beam 315. In the first example, neighboring slots (e.g., a slot 310-b and a slot 310-c) may use the serving UE beam 320. There may be PDCCH and PDSCH 335 included in a slot 310 with the CSI-RS 305. In some cases, the PDSCH 335 may be frequency division multiplexed on the same symbol as the CSI-RS. Using the same beam throughout the slot may provide enhanced channel estimation using the PDSCH DMRS, which may be on another symbol of the same slot. In some cases, the slot-based switching 330 may be enabled if a symbol prediction is inaccurate. For example, if the UE 115 predicts a wrong symbol at a first prediction occasion using the symbol-based switching 325, the UE 115 may implement the slot-based switching 330 for a next occasion.

In some cases, if the CSI-RS slot prediction using the slot-based switching 330 is inaccurate, the UE 115 may use the same beam for multiple slots in a time window around the predicted slot. For example, the UE 115 may predict the CSI-RS 305 is transmitted in the slot 310-a. The UE 115 may use switch to use the candidate UE beam 315 for a window of slots around the predicted slot. For example, the UE 115 may use switch to the candidate UE beam 315 for the slot 310-b, the slot 310-a, and the slot 310-c. In other examples, the window may have a different size, cover a different number of slots, or cover portions of slots. In some cases, the UE 115 may use the same beam for each channel in the window. For example, the UE 115 may use the candidate UE beam 315 for PDCCH, PDSCH, PUCCH, PUSCH, sounding reference signal (SRS) transmissions, CSI-RS reception, or any combination thereof.

Figure 4:
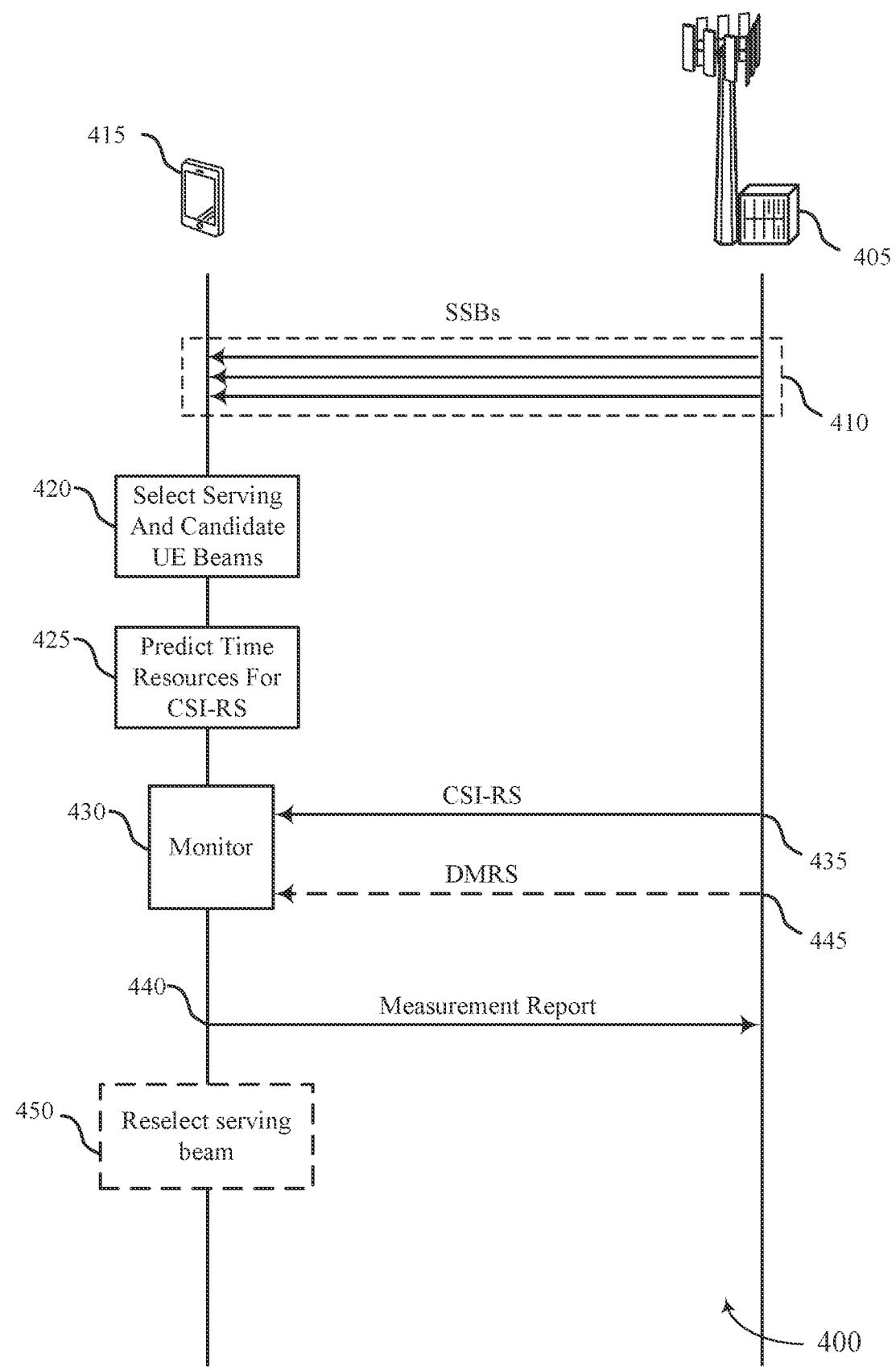
FIG. 4 illustrates an example of a process flow that supports techniques for beam selection using CSI-RS acquisition resources in accordance with aspects of the present disclosure.

FIG. 4 illustrates an example of a process flow 400 that supports techniques for beam selection using CSI-RS acquisition resources in accordance with aspects of the present disclosure. The process flow 400 may include a UE 415 and a base station 405, which may be respective examples of a UE 115 and a base station 105 as described with reference to FIG. 1. In some example, the base station 405 may be an example of an access network entity.

The base station 405 may periodically transmit SSBs. The SSBs may be measured by UEs 115, such as the UE 415, within a coverage area of the base station 405 to synchronize with the base station 405 or select serving beams. The UE 415 may perform a set of SSB measurements at 410. For example, the UE 415 may measure the different SSBs to identify a strong UE beam, base station beam, or beam pair link. The SSBs may have a one-to-one mapping to different base station beams of the base station 405. Therefore, the UE 415 may measure multiple different beams. In some cases, the UE 415 may measure an RSRP a channel impulse response, or another characteristic of the SSBs.

At 420, the UE 415 may select a serving UE beam and a set of candidate UE beams for measuring a CSI-RS based on the set of SSB measurements. For example, the UE 415 may select a UE beam associated with an SSB which has a highest RSRP measurement of the set of SSB measurements for the serving UE beam. The UE 415 may select the set of candidate UE beams based on an RSRP measurement of the subset of beams used for the set of SSB measurements. For example, a top K UE beams based on an RSRP measurement, channel impulse response measurement, an uplink link budget based on a virtual power headroom, or other type of measurement, may be selected for the set of candidate UE beams.

At 425, the UE 415 may identify a set of time resources for the CSI-RS based on one or more previous CSI-RS configurations. In some cases, the UE 415 may predict the set of time resources based on the one or more previous CSI-RS configuration. For example, the UE 415 may predict when the CSI-RS will be transmitted (e.g., in which slot or in which symbol of the slot) in order to provide sufficient time to switch from a serving UE beam to a candidate UE beam. The CSI-RS may be transmitted in a slot with PDCCH that indicates the scheduling information for the CSI-RS. However, if the UE 415 waits to identify the scheduling information based on the PDCCH, the resources for the CSI-RS may have already passed once the PDCCH is processed. Therefore, the UE 415 may predict when the CSI-RS is to be transmitted in order to use the UE candidate beam to measure the CSI-RS.

The UE 415 may monitor downlink channels during at least the identified set of time resources using the candidate UE beam at 430. The base station 405 may transmit a CSI-RS to the UE 415 at 435. The UE 415 may measure the CSI-RS based on the set of time resources using the candidate UE beam from the set of candidate UE beams.

In some cases, the UE 415 may monitor a slot including the identified set of time resources using the candidate UE beam. For example, the UE 415 may communicate using the candidate UE beam for the whole slot to provide a higher likelihood of measuring the CSI-RS with the candidate UE beam. In some examples, the UE 415 may use the candidate UE beam for a set of multiple slots based on a time window around the set of time resources, where the CSI-RS is measured during at least a symbol in the set of multiple slots. For example, the UE 415 may use the candidate UE beam for multiple slots of the UE 415 detects scheduling variations at the base station 405.

In some cases, the UE 415 may use a candidate UE beam for slightly longer periods across instances if the UE 415 predicts the time resources incorrectly. For example, the UE 415 may first perform symbol-based switching and attempt to switch from a serving UE beam to the candidate UE beam just for a predicted symbol carrying the CSI-RS. If the UE 415 predicted the symbol wrong, the UE 415 may perform slot-based switching and use the candidate UE beam for a full slot at a next instance. If the predicted slot for the slot-based switching is wrong, the UE 415 may use the candidate UE beam for a set of multiple slots according to a window around a predicted slot.

In some examples, the set of UE candidate beams may be selected or updated based on previous CSI-RS measurements. For example, the UE 415 may update the set of candidate UE beams based on measuring the CSI-RS, additional SSB measurements, one or more CSI-RS measurements using one or more additional candidate UE beams, or any combination thereof.

In some examples, the base station 405 and the UE 415 may implement techniques to measure PDSCH DMRS using candidate UE beams or perform UE beam sweeping for PDSCH DMRS. In some cases, the techniques for UE beam sweeping for PDSCH DMRS may be similar to some techniques used in the process flow 400 for beam selection using CSI-RS acquisition resources. For example, at 410, the UE 415 may perform a set of SSB measurements and select a serving UE beam and a set of candidate UE beams based on the SSB measurements at 410. UE 415 communicate with base station 405 and receive a threshold number of downlink grants with a DMRS using the serving UE beam.

Once the UE 415 receives the threshold number of downlink grants with DMRS, the UE 415 may switch to a candidate UE beam from the set of candidate UE beams. For example, at 430, the UE 415 may monitor one or more wireless channels of a slot using a candidate UE beam from the set of candidate UE beams based on receiving the threshold number of downlink grants. For example, the UE 415 may use the selected candidate UE beam for all channels of one or more slots to monitor for PDSCH DMRS. The base station 405 may transmit DMRS on PDSCH resources of the slot at 445. The UE 415 may measure one or more DMRS transmitted over the one or more wireless channels of the slot using the candidate UE beam. Then similarly to 440, the UE 415 may transmit, to the base station, a measurement report based on measuring the one or more DMRS using the candidate UE beam or a last measurement using the serving UE beam, or both. For example, the measurement report may include an SNR or spectral efficiency measurement made using the candidate UE beam or a previous SNR or spectral efficiency measurement made using the serving UE beam, or any combination thereof.

In some examples, the UE 415 may process a measurement of the channel state information reference signal, such as for serving beam selection purposes. For example, the UE 415 may process the measured spectral efficiency for serving beam selection purposes. For example, at 450 the UE 415 may perform filtering, biasing, or thresholding for a first rank and second rank of the measurement as part of reselecting the serving beam. In some cases, the UE 415 may select a serving beam (e.g., reselect the serving beam to a candidate UE beam from the set of candidate UE beams) based on the measured, filtered, biased, or thresholded spectral efficiencies of the candidate beams.

Figure 5:
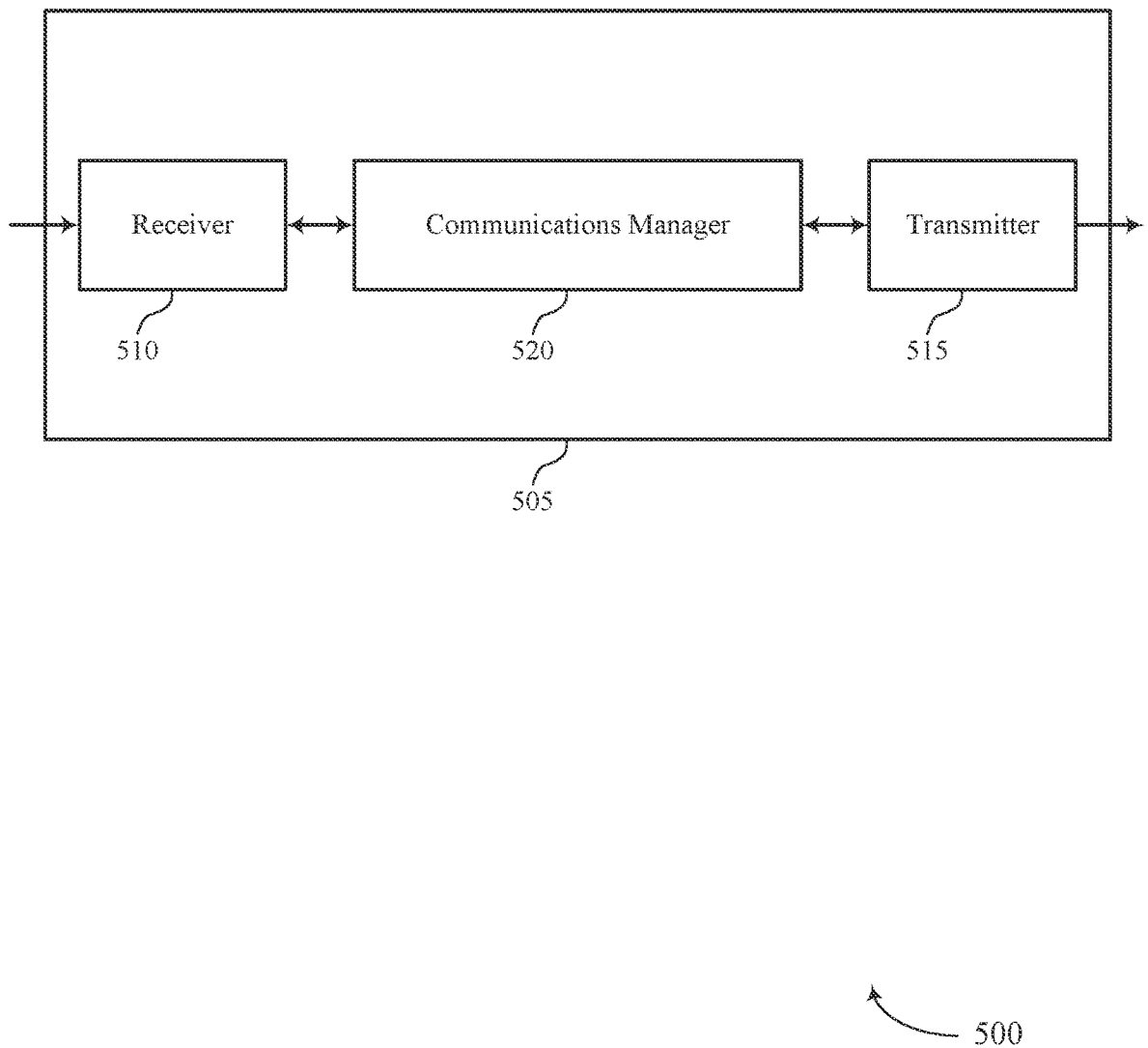
FIGS. 5 and 6 show block diagrams of devices that support techniques for beam selection using CSI-RS acquisition resources in accordance with aspects of the present disclosure.

FIG. 5 shows a block diagram 500 of a device 505 that supports techniques for beam selection using CSI-RS acquisition resources in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam selection using CSI-RS acquisition resources). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam selection using CSI-RS acquisition resources). In some examples, the transmitter 515 may be co-located with a receiver 510 in a transceiver. The transmitter 515 may utilize a single antenna or a set of multiple antennas.

The communications manager 520, the receiver 510, the transmitter 515, or various combinations thereof or various components thereof may be examples of means for performing various aspects of techniques for beam selection using CSI-RS acquisition resources as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for performing a set of synchronization signal block measurements. The communications manager 520 may be configured as or otherwise support a means for selecting a serving UE beam and a set of candidate UE beams for measuring a CSI-RS based on the set of synchronization signal block measurements. The communications manager 520 may be configured as or otherwise support a means for identifying a set of time resources for the CSI-RS based on one or more previous CSI-RS configurations. The communications manager 520 may be configured as or otherwise support a means for measuring the CSI-RS based on the set of time resources using a candidate UE beam from the set of candidate UE beams. The communications manager 520 may be configured as or otherwise support a means for transmitting, to an access network entity, a measurement report based on measuring the CSI-RS using the candidate UE beam or a last CSI-RS measurement on the serving UE beam, or both.

Additionally or alternatively, the communications manager 520 may support wireless communication at a UE in accordance with examples as disclosed herein. For example, the communications manager 520 may be configured as or otherwise support a means for performing a set of synchronization signal block measurements. The communications manager 520 may be configured as or otherwise support a means for selecting a serving UE beam and a set of candidate UE beams for measuring a channel state information reference signal based on the set of synchronization signal block measurements. The communications manager 520 may be configured as or otherwise support a means for receiving a threshold number of downlink grants with a demodulation reference signal using the serving UE beam. The communications manager 520 may be configured as or otherwise support a means for monitoring one or more wireless channels of a slot using a candidate UE beam from the set of candidate UE beams based on receiving the threshold number of downlink grants. The communications manager 520 may be configured as or otherwise support a means for measuring one or more demodulation reference signals transmitted over the one or more wireless channels of the slot using the candidate UE beam. The communications manager 520 may be configured as or otherwise support a means for transmitting, to an access network entity, a measurement report based on measuring the one or more demodulation reference signals using the candidate UE beam or a last measurement using the serving UE beam, or both.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for measuring CSI-RS using a candidate UE beam. Measuring CSI-RS using candidate UE beams may improve beam selection techniques and provide more information for candidate beams. This information may be used when performing beam selection or reselection to select a strongest beam and increase throughput.

Figure 6:
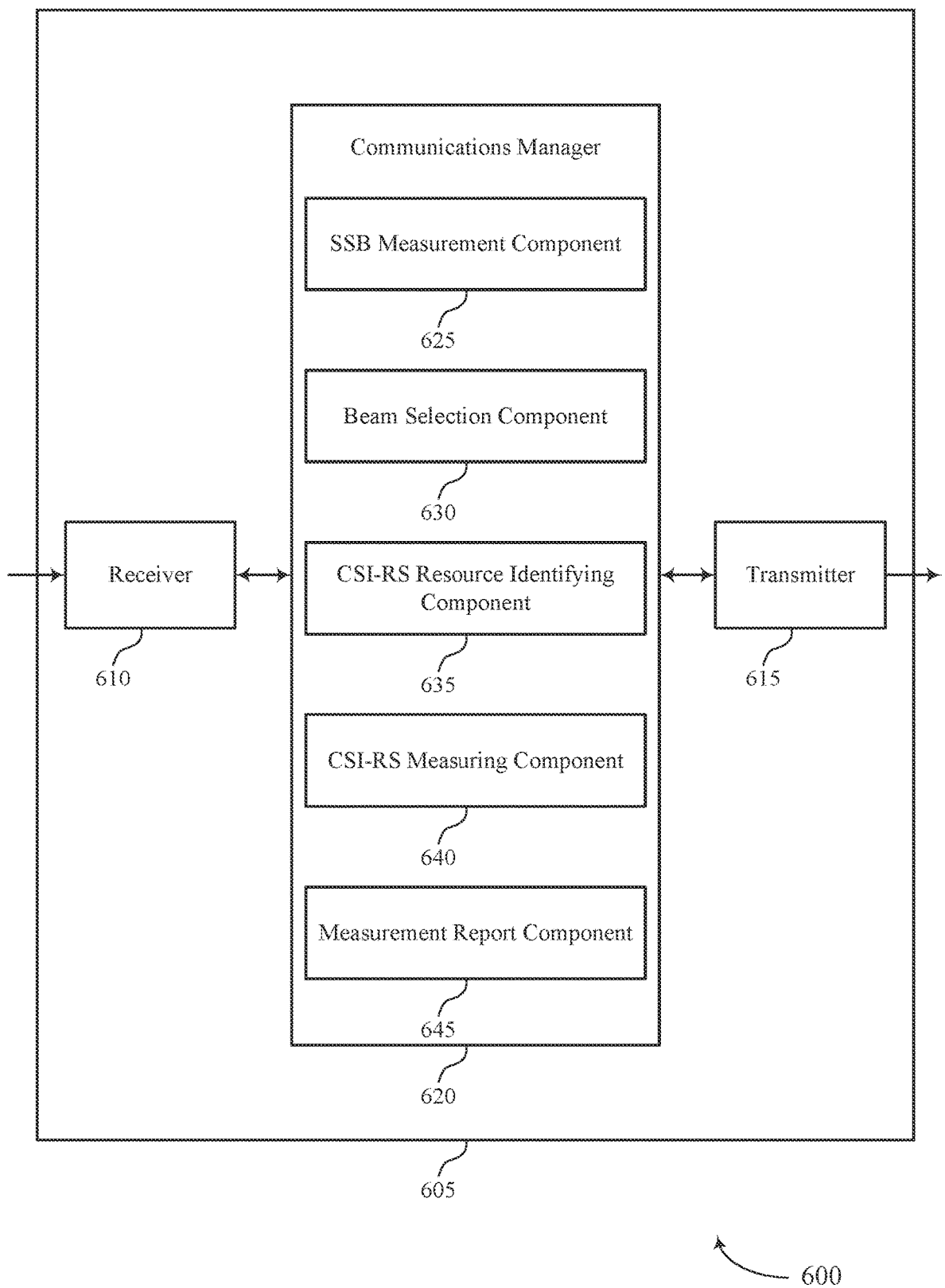

FIG. 6 shows a block diagram 600 of a device 605 that supports techniques for beam selection using CSI-RS acquisition resources in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam selection using CSI-RS acquisition resources). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam selection using CSI-RS acquisition resources). In some examples, the transmitter 615 may be co-located with a receiver 610 in a transceiver. The transmitter 615 may utilize a single antenna or a set of multiple antennas.

The device 605, or various components thereof, may be an example of means for performing various aspects of techniques for beam selection using CSI-RS acquisition resources as described herein. For example, the communications manager 620 may include an SSB measurement component 625, a beam selection component 630, a CSI-RS resource identifying component 635, a CSI-RS measuring component 640, a measurement report component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SSB measurement component 625 may be configured as or otherwise support a means for performing a set of synchronization signal block measurements. The beam selection component 630 may be configured as or otherwise support a means for selecting a serving UE beam and a set of candidate UE beams for measuring a CSI-RS based on the set of synchronization signal block measurements. The CSI-RS resource identifying component 635 may be configured as or otherwise support a means for identifying a set of time resources for the CSI-RS based on one or more previous CSI-RS configurations. The CSI-RS measuring component 640 may be configured as or otherwise support a means for measuring the CSI-RS based on the set of time resources using a candidate UE beam from the set of candidate UE beams. The measurement report component 645 may be configured as or otherwise support a means for transmitting, to an access network entity, a measurement report based on measuring the CSI-RS using the candidate UE beam or a last CSI-RS measurement on the serving UE beam, or both.

Additionally or alternatively, the communications manager 620 may support wireless communication at a UE in accordance with examples as disclosed herein. The SSB measurement component 625 may be configured as or otherwise support a means for performing a set of synchronization signal block measurements. The beam selection component 630 may be configured as or otherwise support a means for selecting a serving UE beam and a set of candidate UE beams for measuring a channel state information reference signal based on the set of synchronization signal block measurements. The beam selection component 630 may be configured as or otherwise support a means for receiving a threshold number of downlink grants with a demodulation reference signal using the serving UE beam. The measurement report component 645 may be configured as or otherwise support a means for monitoring one or more wireless channels of a slot using a candidate UE beam from the set of candidate UE beams based on receiving the threshold number of downlink grants. The measurement report component 645 may be configured as or otherwise support a means for measuring one or more demodulation reference signals transmitted over the one or more wireless channels of the slot using the candidate UE beam. The measurement report component 645 may be configured as or otherwise support a means for transmitting, to an access network entity, a measurement report based on measuring the one or more demodulation reference signals using the candidate UE beam or a last measurement using the serving UE beam, or both.

Figure 7:
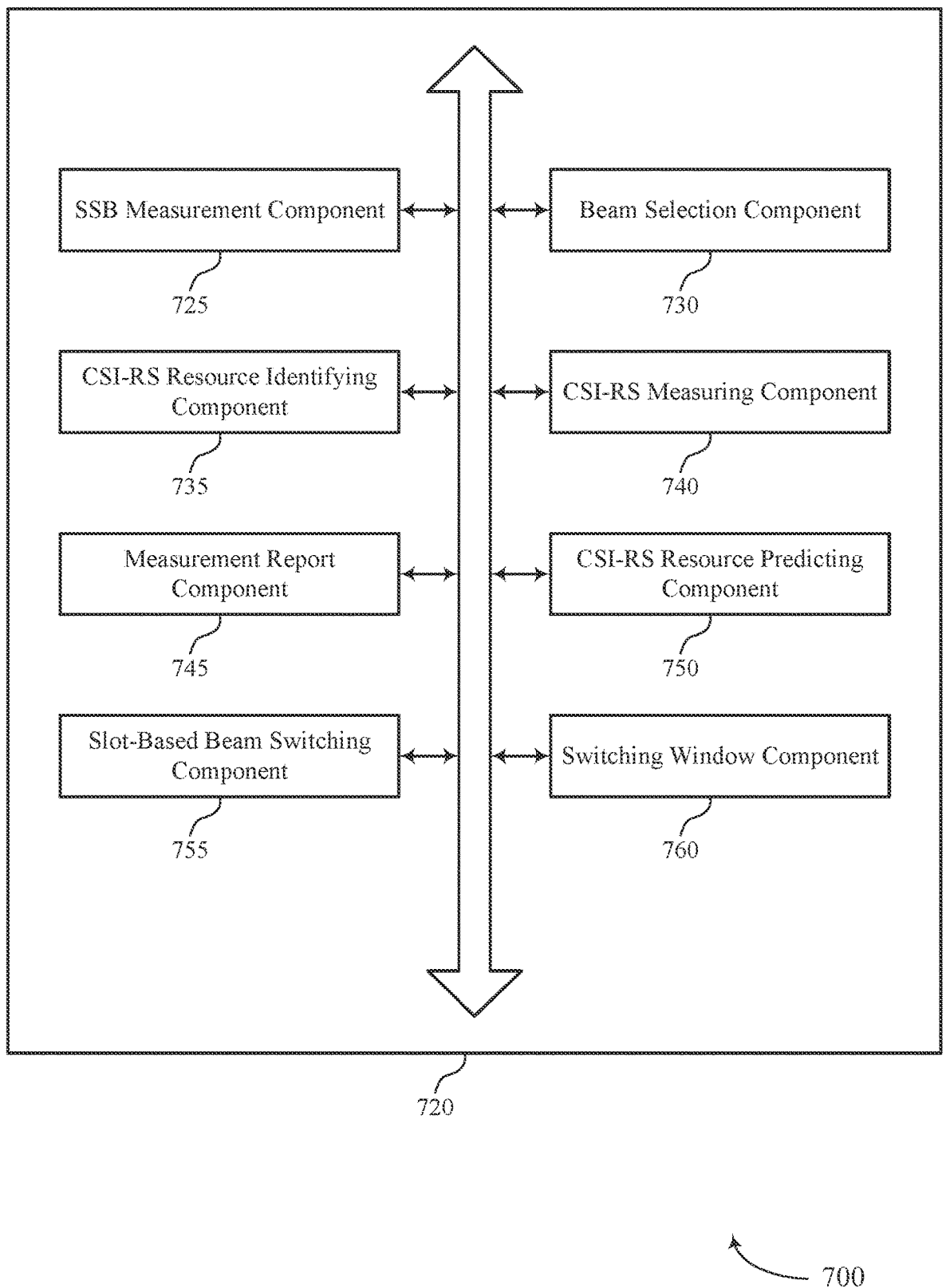
FIG. 7 shows a block diagram of a communications manager that supports techniques for beam selection using CSI-RS acquisition resources in accordance with aspects of the present disclosure.

FIG. 7 shows a block diagram 700 of a communications manager 720 that supports techniques for beam selection using CSI-RS acquisition resources in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for beam selection using CSI-RS acquisition resources as described herein. For example, the communications manager 720 may include an SSB measurement component 725, a beam selection component 730, a CSI-RS resource identifying component 735, a CSI-RS measuring component 740, a measurement report component 745, a CSI-RS resource predicting component 750, a slot-based beam switching component 755, a switching window component 760, or any combination thereof. Each of these components may communicate, directly or indirectly, with one another (e.g., via one or more buses).

The communications manager 720 may support wireless communication at a UE in accordance with examples as disclosed herein. The SSB measurement component 725 may be configured as or otherwise support a means for performing a set of synchronization signal block measurements. The beam selection component 730 may be configured as or otherwise support a means for selecting a serving UE beam and a set of candidate UE beams for measuring a CSI-RS based on the set of synchronization signal block measurements. The CSI-RS resource identifying component 735 may be configured as or otherwise support a means for identifying a set of time resources for the CSI-RS based on one or more previous CSI-RS configurations. The CSI-RS measuring component 740 may be configured as or otherwise support a means for measuring the CSI-RS based on the set of time resources using a candidate UE beam from the set of candidate UE beams. The measurement report component 745 may be configured as or otherwise support a means for transmitting, to an access network entity, a measurement report based on measuring the CSI-RS using the candidate UE beam or a last CSI-RS measurement on the serving UE beam, or both.

The communications manager 720 may support wireless communication at a UE in accordance with examples as disclosed herein. The SSB measurement component 725 may be configured as or otherwise support a means for performing a set of synchronization signal block measurements. The beam selection component 730 may be configured as or otherwise support a means for selecting a serving UE beam and a set of candidate UE beams for measuring a channel state information reference signal based on the set of synchronization signal block measurements. In some examples, the beam selection component 730 may be configured as or otherwise support a means for receiving a threshold number of downlink grants with a demodulation reference signal using the serving UE beam. The measurement report component 735 may be configured as or otherwise support a means for monitoring one or more wireless channels of a slot using a candidate UE beam from the set of candidate UE beams based on receiving the threshold number of downlink grants. In some examples, the measurement report component 745 may be configured as or otherwise support a means for measuring one or more demodulation reference signals transmitted over the one or more wireless channels of the slot using the candidate UE beam. In some examples, the measurement report component 745 may be configured as or otherwise support a means for transmitting, to an access network entity, a measurement report based on measuring the one or more demodulation reference signals using the candidate UE beam or a last measurement using the serving UE beam, or both.

In some examples, to support identifying the set of time resources, the CSI-RS resource predicting component 750 may be configured as or otherwise support a means for predicting the set of time resources based on the one or more previous CSI-RS configurations.

In some examples, the slot-based beam switching component 755 may be configured as or otherwise support a means for determining a slot format for a slot including the set of time resources, where the slot format includes at least one downlink shared channel resource. In some examples, the slot-based beam switching component 755 may be configured as or otherwise support a means for monitoring the slot using the candidate UE beam based on determining the slot format, where the CSI-RS is measured based on monitoring the slot.

In some examples, the slot-based beam switching component 755 may be configured as or otherwise support a means for measuring a demodulation reference signal on the at least one downlink shared channel resource using the candidate UE beam. In some examples, the slot-based beam switching component 755 may be configured as or otherwise support a means for performing channel estimation for the slot based on measuring the demodulation reference signal.

In some examples, the switching window component 760 may be configured as or otherwise support a means for using the candidate UE beam for a set of multiple slots based on a time window around the set of time resources, where the CSI-RS is measured during at least a symbol in the set of multiple slots.

In some examples, the switching window component 760 may be configured as or otherwise support a means for determining a scheduling variation for the access network entity, where the candidate UE beam is used for the set of multiple slots based on the scheduling variation.

In some examples, to support using the candidate UE beam for the set of multiple slots, the switching window component 760 may be configured as or otherwise support a means for using the candidate UE beam for uplink communications and downlink communications during the set of multiple slots.

In some examples, the slot-based beam switching component 755 may be configured as or otherwise support a means for monitoring a slot including the set of time resources using the candidate UE beam, where the CSI-RS resource is measured on a different symbol of the slot than a predicted symbol for the CSI-RS of the set of time resources.

In some examples, to support identifying the set of time resources, the CSI-RS resource predicting component 750 may be configured as or otherwise support a means for identifying an aperiodic reference signal resource configuration from the one or more previous CSI-RS configurations. In some examples, to support identifying the set of time resources, the CSI-RS resource predicting component 750 may be configured as or otherwise support a means for determining scheduling information for the one or more previous channel state information measurements based on the aperiodic reference signal resource configuration, where the set of time resources is identified based on the scheduling information.

In some examples, to support measuring the CSI-RS, the CSI-RS measuring component 740 may be configured as or otherwise support a means for measuring a spectral efficiency using the candidate UE beam based on the CSI-RS, where the measurement report is generated based on the spectral efficiency.

In some examples, the CSI-RS measuring component 740 may be configured as or otherwise support a means for measuring the spectral efficiency separately for each rank of the candidate UE beam.

In some examples, the beam selection component 730 may be configured as or otherwise support a means for updating the set of candidate UE beams based on measuring the CSI-RS, additional synchronization signal block measurements, one or more CSI-RS measurements using one or more additional candidate UE beams, or any combination thereof.

In some examples, the beam selection component 730 may be configured as or otherwise support a means for reselecting the serving UE beam based on measuring the channel state information reference signal.

In some examples, the beam selection component 730 may be configured as or otherwise support a means for performing a filtering, a biasing, a thresholding, or any combination thereof, for a first rank and a second rank of a measurement of the channel state information reference signal, where reselection of the serving beam is based on the filtering, the biasing, the thresholding, or any combination thereof.

In some examples, to support identifying the set of candidate UE beams, the SSB measurement component 725 may be configured as or otherwise support a means for identifying the set of candidate UE beams from a subset of beams used for the set of synchronization signal block measurements.

In some examples, the set of candidate UE beams are identified based on a reference signal received power measurement of the subset of beams used for the set of synchronization signal block measurements.

In some examples, the set of candidate UE beams are identified based on a channel impulse response measurement of the subset of beams used for the set of synchronization signal block measurements. In some examples, the set of candidate UE beams are identified based on an uplink link budget of the UE. In some examples, the CSI-RS is an acquisition CSI-RS.

Figure 8:
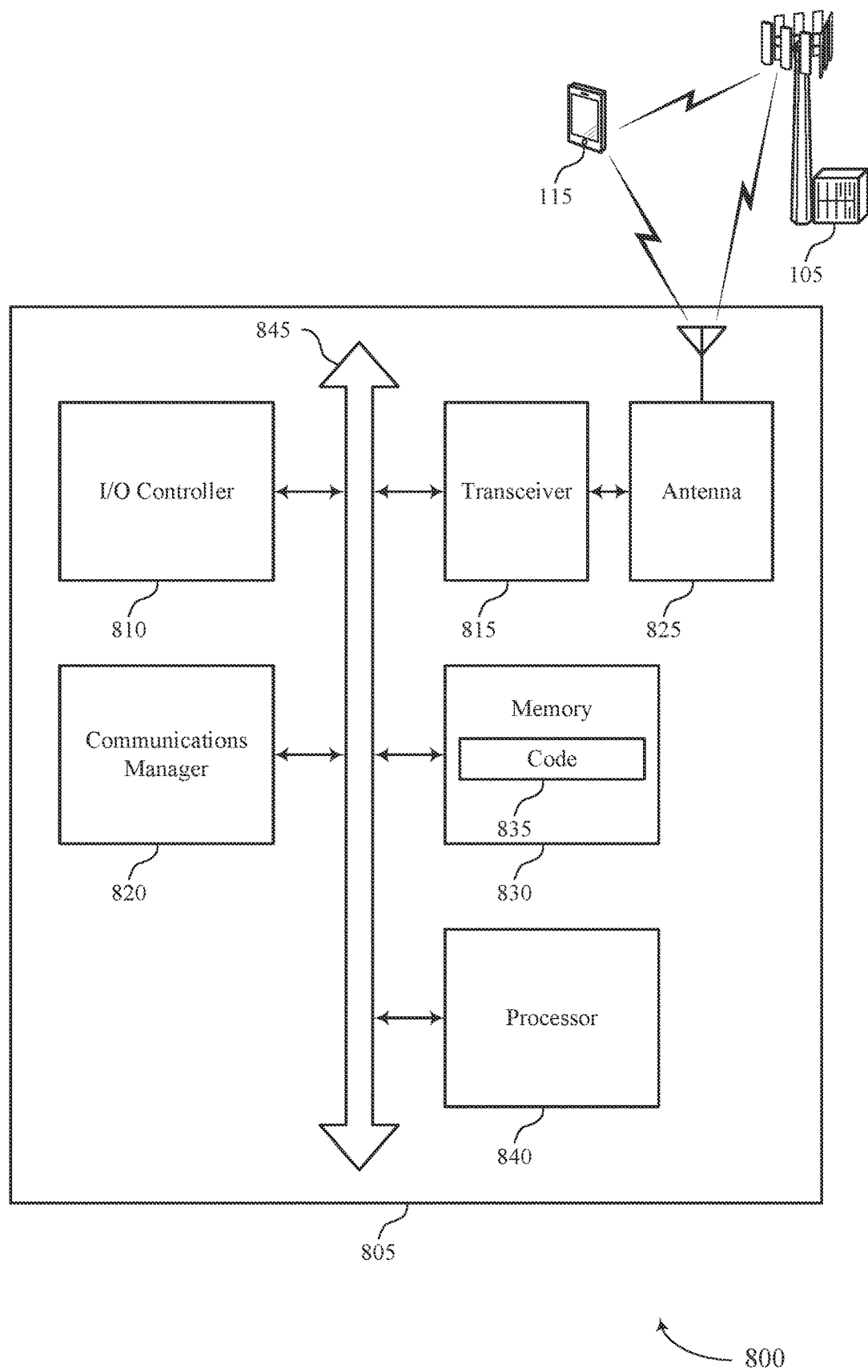
FIG. 8 shows a diagram of a system including a device that supports techniques for beam selection using CSI-RS acquisition resources in accordance with aspects of the present disclosure.

FIG. 8 shows a diagram of a system 800 including a device 805 that supports techniques for beam selection using CSI-RS acquisition resources in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for beam selection using CSI-RS acquisition resources). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for performing a set of synchronization signal block measurements. The communications manager 820 may be configured as or otherwise support a means for selecting a serving UE beam and a set of candidate UE beams for measuring a CSI-RS based on the set of synchronization signal block measurements. The communications manager 820 may be configured as or otherwise support a means for identifying a set of time resources for the CSI-RS based on one or more previous CSI-RS configurations. The communications manager 820 may be configured as or otherwise support a means for measuring the CSI-RS based on the set of time resources using a candidate UE beam from the set of candidate UE beams. The communications manager 820 may be configured as or otherwise support a means for transmitting, to a base station, a measurement report based on measuring the CSI-RS using the candidate UE beam or a last CSI-RS measurement on the serving UE beam, or both.

Additionally or alternatively, the communications manager 820 may be configured as or otherwise support a means for receiving a threshold number of downlink grants with a demodulation reference signal using the serving UE beam. The communications manager 820 may be configured as or otherwise support a means for monitoring one or more wireless channels of a slot using a candidate UE beam from the set of candidate UE beams based on receiving the threshold number of downlink grants. The communications manager 820 may be configured as or otherwise support a means for measuring one or more demodulation reference signals transmitted over the one or more wireless channels of the slot using the candidate UE beam. The communications manager 820 may be configured as or otherwise support a means for transmitting, to a base station, a measurement report based on measuring the one or more demodulation reference signals using the candidate UE beam or a last measurement using the serving UE beam, or both.

By including or configuring the communications manager 820 in accordance with examples as described herein, the device 805 may support techniques for measuring CSI-RS using a candidate UE beam and predicting time resources for the CSI-RS. These techniques may enable a UE 115 to switch beams (e.g., from a serving UE beam to a candidate UE beam) in time to measure the CSI-RS with the candidate UE beam. A UE 115 may use these techniques instead of processing a PDCCH earlier in the slot, as the CSI-RS may have already passed once the PDCCH is processed and the slot information is determined. For example, the UE 115 may buffer information, which is processed and obtained from the buffer after the resources conveying that information have already passed. However, with something such as a measurement with a different beam, the UE 115 has to have already switched beams by the time the measurement resource occurs. Therefore, the UE 115 may not wait to process the PDCCH to find the location of the CSI-RS and instead may employ these techniques to predict where the CSI-RS will be in the slot.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for beam selection using CSI-RS acquisition resources as described herein, or the processor 840 and the memory 830 may be otherwise configured to perform or support such operations.

Figure 9:
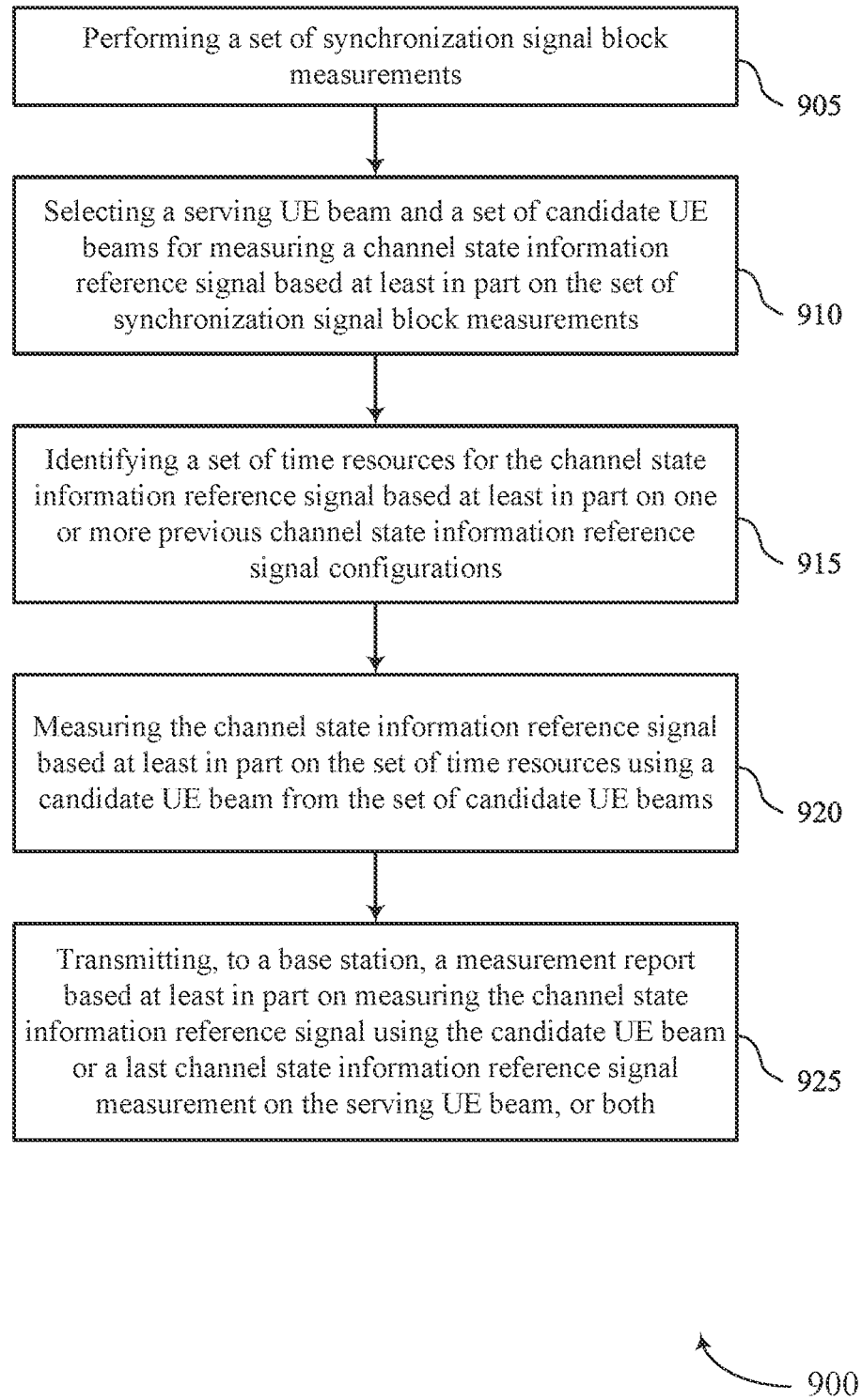
FIGS. 9 through 12 show flowcharts illustrating methods that support techniques for beam selection using CSI-RS acquisition resources in accordance with aspects of the present disclosure.

FIG. 9 shows a flowchart illustrating a method 900 that supports techniques for beam selection using CSI-RS acquisition resources in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include performing a set of synchronization signal block measurements. The operations of 905 may be performed in accordance with examples as disclosed herein. In some examples, aspects of the operations of 905 may be performed by an SSB measurement component 725 as described with reference to FIG. 7.

At 910, the method may include selecting a serving UE beam and a set of candidate UE beams for measuring a CSI-RS based on the set of synchronization signal block measurements. The operations of 910 may be performed in accordance with examples as disclosed herein. In some examples, aspects of the operations of 910 may be performed by a beam selection component 730 as described with reference to FIG. 7.

At 915, the method may include identifying a set of time resources for the CSI-RS based on one or more previous CSI-RS configurations. The operations of 915 may be performed in accordance with examples as disclosed herein. In some examples, aspects of the operations of 915 may be performed by a CSI-RS resource identifying component 735 as described with reference to FIG. 7.

At 920, the method may include measuring the CSI-RS based on the set of time resources using a candidate UE beam from the set of candidate UE beams. The operations of 920 may be performed in accordance with examples as disclosed herein. In some examples, aspects of the operations of 920 may be performed by a CSI-RS measuring component 740 as described with reference to FIG. 7.

At 925, the method may include transmitting, to a base station, a measurement report based on measuring the CSI-RS using the candidate UE beam or a last CSI-RS measurement on the serving UE beam, or both. The operations of 925 may be performed in accordance with examples as disclosed herein. In some examples, aspects of the operations of 925 may be performed by a measurement report component 745 as described with reference to FIG. 7.

Figure 10:
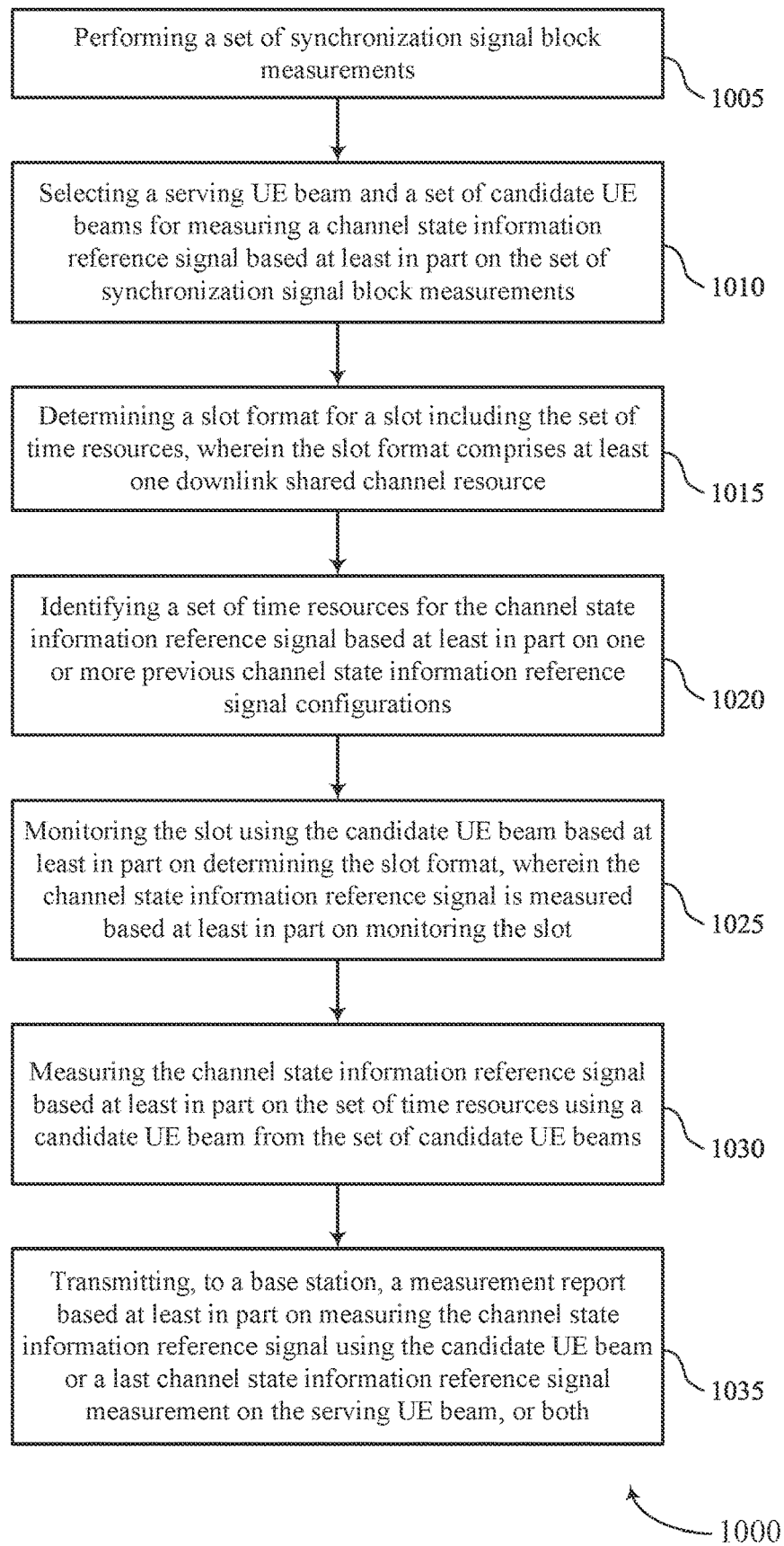

FIG. 10 shows a flowchart illustrating a method 1000 that supports techniques for beam selection using CSI-RS acquisition resources in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include performing a set of synchronization signal block measurements. The operations of 1005 may be performed in accordance with examples as disclosed herein. In some examples, aspects of the operations of 1005 may be performed by an SSB measurement component 725 as described with reference to FIG. 7.

At 1010, the method may include selecting a serving UE beam and a set of candidate UE beams for measuring a CSI-RS based on the set of synchronization signal block measurements. The operations of 1010 may be performed in accordance with examples as disclosed herein. In some examples, aspects of the operations of 1010 may be performed by a beam selection component 730 as described with reference to FIG. 7.

At 1015, the method may include determining a slot format for a slot including the set of time resources, where the slot format includes at least one downlink shared channel resource. The operations of 1015 may be performed in accordance with examples as disclosed herein. In some examples, aspects of the operations of 1015 may be performed by a slot-based beam switching component 755 as described with reference to FIG. 7.

At 1020, the method may include identifying a set of time resources for the CSI-RS based on one or more previous CSI-RS configurations. The operations of 1020 may be performed in accordance with examples as disclosed herein. In some examples, aspects of the operations of 1020 may be performed by a CSI-RS resource identifying component 735 as described with reference to FIG. 7.

At 1025, the method may include monitoring the slot using the candidate UE beam based on determining the slot format, where the CSI-RS is measured based on monitoring the slot. The operations of 1025 may be performed in accordance with examples as disclosed herein. In some examples, aspects of the operations of 1025 may be performed by a slot-based beam switching component 755 as described with reference to FIG. 7.

At 1030, the method may include measuring the CSI-RS based on the set of time resources using a candidate UE beam from the set of candidate UE beams. The operations of 1030 may be performed in accordance with examples as disclosed herein. In some examples, aspects of the operations of 1030 may be performed by a CSI-RS measuring component 740 as described with reference to FIG. 7.

At 1035, the method may include transmitting, to a base station, a measurement report based on measuring the CSI-RS using the candidate UE beam or a last CSI-RS measurement on the serving UE beam, or both. The operations of 1035 may be performed in accordance with examples as disclosed herein. In some examples, aspects of the operations of 1035 may be performed by a measurement report component 745 as described with reference to FIG. 7.

Figure 11:
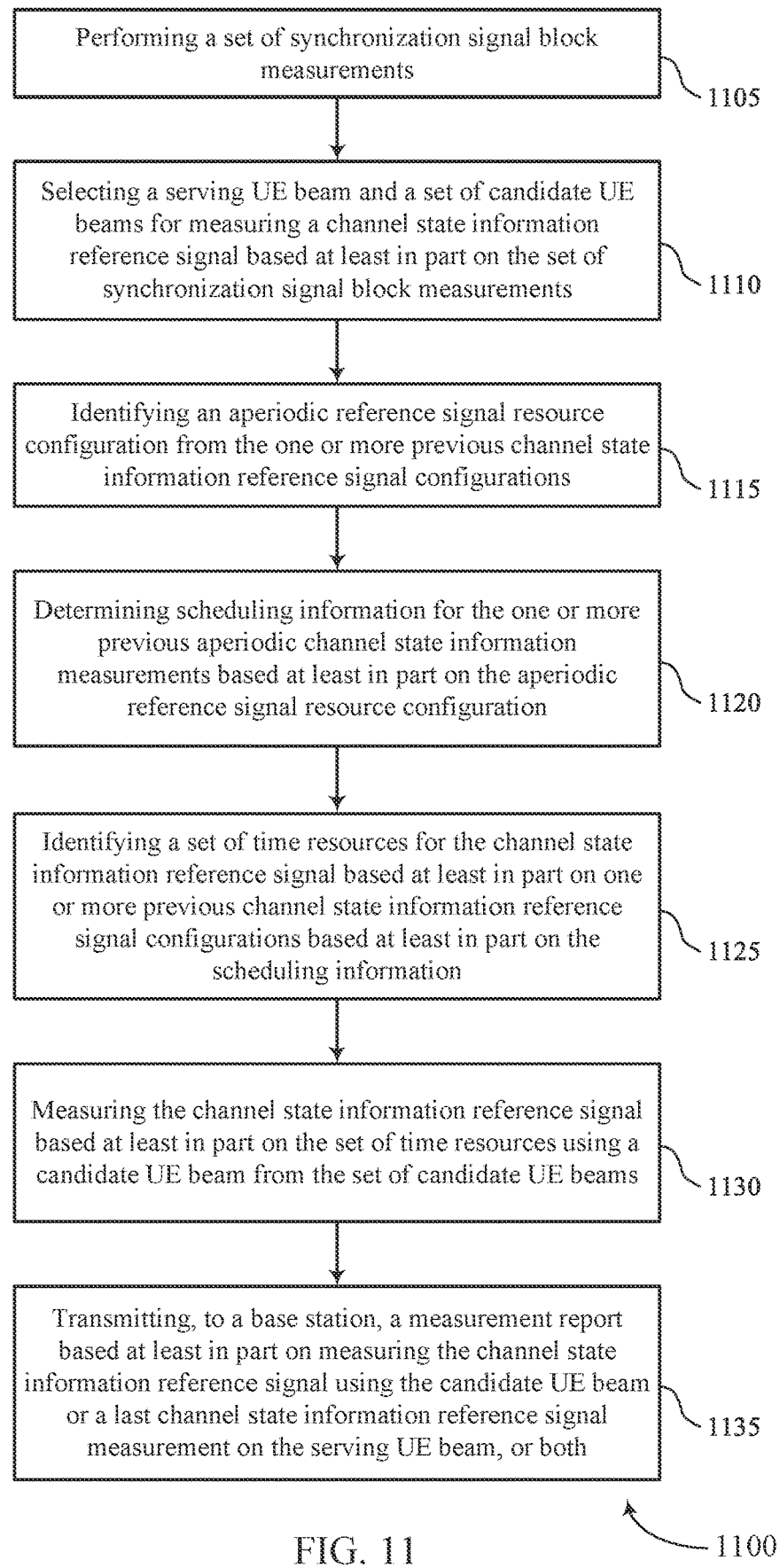

FIG. 11 shows a flowchart illustrating a method 1100 that supports techniques for beam selection using CSI-RS acquisition resources in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include performing a set of synchronization signal block measurements. The operations of 1105 may be performed in accordance with examples as disclosed herein. In some examples, aspects of the operations of 1105 may be performed by an SSB measurement component 725 as described with reference to FIG. 7.

At 1110, the method may include selecting a serving UE beam and a set of candidate UE beams for measuring a CSI-RS based on the set of synchronization signal block measurements. The operations of 1110 may be performed in accordance with examples as disclosed herein. In some examples, aspects of the operations of 1110 may be performed by a beam selection component 730 as described with reference to FIG. 7.

At 1115, the method may include identifying an aperiodic reference signal resource configuration from the one or more previous CSI-RS configurations. The operations of 1115 may be performed in accordance with examples as disclosed herein. In some examples, aspects of the operations of 1115 may be performed by a CSI-RS resource predicting component 750 as described with reference to FIG. 7.

At 1120, the method may include determining scheduling information for the one or more previous CSI measurements based on the aperiodic reference signal resource configuration. The operations of 1120 may be performed in accordance with examples as disclosed herein. In some examples, aspects of the operations of 1120 may be performed by a CSI-RS resource predicting component 750 as described with reference to FIG. 7.

At 1125, the method may include identifying a set of time resources for the CSI-RS based on one or more previous CSI-RS configurations, where the set of time resources is identified based on the scheduling information of the one or more previous CSI measurements (e.g., the previous aperiodic CSI measurements). The operations of 1125 may be performed in accordance with examples as disclosed herein. In some examples, aspects of the operations of 1125 may be performed by a CSI-RS resource identifying component 735 as described with reference to FIG. 7.

At 1130, the method may include measuring the CSI-RS based on the set of time resources using a candidate UE beam from the set of candidate UE beams. The operations of 1130 may be performed in accordance with examples as disclosed herein. In some examples, aspects of the operations of 1130 may be performed by a CSI-RS measuring component 740 as described with reference to FIG. 7.

At 1135, the method may include transmitting, to a base station, a measurement report based on measuring the CSI-RS using the candidate UE beam or a last CSI-RS measurement on the serving UE beam, or both. The operations of 1135 may be performed in accordance with examples as disclosed herein. In some examples, aspects of the operations of 1135 may be performed by a measurement report component 745 as described with reference to FIG. 7.

Figure 12:
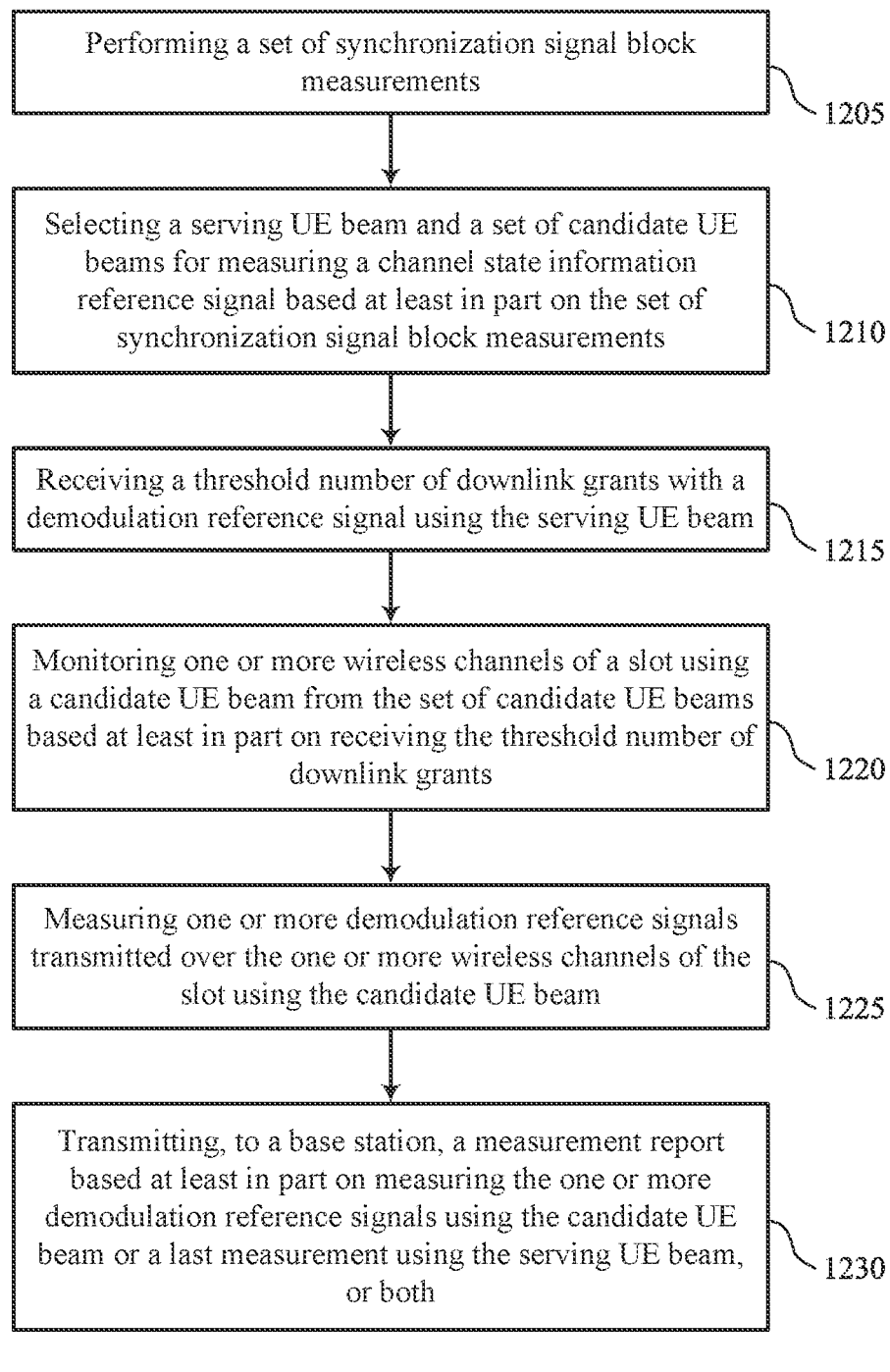

FIG. 12 shows a flowchart illustrating a method 1200 that supports beam selection using CSI-RS acquisition resources in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include performing a set of synchronization signal block measurements. The operations of 1205 may be performed in accordance with examples as disclosed herein. In some examples, aspects of the operations of 1205 may be performed by an SSB measurement component 725 as described with reference to FIG. 7.

At 1210, the method may include selecting a serving UE beam and a set of candidate UE beams for measuring a CSI-RS based on the set of synchronization signal block measurements. The operations of 1210 may be performed in accordance with examples as disclosed herein. In some examples, aspects of the operations of 1210 may be performed by a beam selection component 730 as described with reference to FIG. 7.

At 1215, the method may include receiving a threshold number of downlink grants with a DMRS using the serving UE beam. The operations of 1215 may be performed in accordance with examples as disclosed herein. In some examples, aspects of the operations of 1215 may be performed by a beam selection component 730 as described with reference to FIG. 7.

At 1220, the method may include monitoring one or more wireless channels of a slot using a candidate UE beam from the set of candidate UE beams based on receiving the threshold number of downlink grants. The operations of 1220 may be performed in accordance with examples as disclosed herein. In some examples, aspects of the operations of 1220 may be performed by a measurement report component 745 as described with reference to FIG. 7.

At 1225, the method may include measuring one or more DMRSs transmitted over the one or more wireless channels of the slot using the candidate UE beam. The operations of 1225 may be performed in accordance with examples as disclosed herein. In some examples, aspects of the operations of 1225 may be performed by a measurement report component 745 as described with reference to FIG. 7.

At 1230, the method may include transmitting, to a base station, a measurement report based on measuring the one or more DMRSs using the candidate UE beam or a last measurement using the serving UE beam, or both. The operations of 1230 may be performed in accordance with examples as disclosed herein. In some examples, aspects of the operations of 1230 may be performed by a measurement report component 745 as described with reference to FIG. 7.

The following provides an overview of aspects of the present disclosure:

Aspect 1: A method for wireless communication at a UE, comprising: performing a set of synchronization signal block measurements; selecting a serving UE beam and a set of candidate UE beams for measuring a channel state information reference signal based at least in part on the set of synchronization signal block measurements; identifying a set of time resources for the channel state information reference signal based at least in part on one or more previous channel state information reference signal configurations; measuring the channel state information reference signal based at least in part on the set of time resources using a candidate UE beam from the set of candidate UE beams; and transmitting, to an access network entity, a measurement report based at least in part on measuring the channel state information reference signal using the candidate UE beam or a last channel state information reference signal measurement on the serving UE beam, or both.

Aspect 2: The method of aspect 1, wherein identifying the set of time resources comprises: predicting the set of time resources based at least in part on the one or more previous channel state information reference signal configurations.

Aspect 3: The method of any of aspects 1 through 2, further comprising: determining a slot format for a slot including the set of time resources, wherein the slot format comprises at least one downlink shared channel resource; and monitoring the slot using the candidate UE beam based at least in part on determining the slot format, wherein the channel state information reference signal is measured based at least in part on monitoring the slot.

Aspect 4: The method of aspect 3, further comprising: measuring a demodulation reference signal on the at least one downlink shared channel resource using the candidate UE beam; and performing channel estimation for the slot based at least in part on measuring the demodulation reference signal.

Aspect 5: The method of any of aspects 1 through 2, further comprising: using the candidate UE beam for a plurality of slots based at least in part on a time window around the set of time resources, wherein the channel state information reference signal is measured during at least a symbol in the plurality of slots.

Aspect 6: The method of aspect 5, further comprising: determining a scheduling variation for the access network entity, wherein the candidate UE beam is used for the plurality of slots based at least in part on the scheduling variation.

Aspect 7: The method of any of aspects 5 through 6, wherein using the candidate UE beam for the plurality of slots comprises: using the candidate UE beam for uplink communications and downlink communications during the plurality of slots.

Aspect 8: The method of any of aspects 1 through 7, further comprising: monitoring a slot including the set of time resources using the candidate UE beam, wherein the channel state information reference signal resource is measured on a different symbol of the slot than a predicted symbol for the channel state information reference signal of the set of time resources.

Aspect 9: The method of any of aspects 1 through 8, wherein identifying the set of time resources comprises: identifying an aperiodic reference signal resource configuration from the one or more previous channel state information reference signal configurations; and determining scheduling information for the one or more previous aperiodic channel state information measurements based at least in part on the aperiodic reference signal resource configuration, wherein the set of time resources is identified based at least in part on the scheduling information.

Aspect 10: The method of any of aspects 1 through 9, wherein measuring the channel state information reference signal comprises: measuring a spectral efficiency using the candidate UE beam based at least in part on the channel state information reference signal, wherein the measurement report is generated based at least in part on the spectral efficiency.

Aspect 11: The method of aspect 10, further comprising: measuring the spectral efficiency separately for each rank of the candidate UE beam.

Aspect 12: The method of any of aspects 1 through 11, further comprising: updating the set of candidate UE beams based at least in part on measuring the channel state information reference signal, additional synchronization signal block measurements, one or more channel state information reference signal measurements using one or more additional candidate UE beams, or any combination thereof.

Aspect 13: The method of any of aspects 1 through 12, further comprising: reselecting the serving UE beam based at least in part on measuring the channel state information reference signal.

Aspect 14: The method of aspect 13, further comprising: performing a filtering, a biasing, a thresholding, or any combination thereof, for a first rank and a second rank of a measurement of the channel state information reference signal, wherein reselection of the serving beam is based at least in part on the filtering, the biasing, the thresholding, or any combination thereof.

Aspect 15: The method of any of aspects 1 through 14, wherein identifying the set of candidate UE beams comprises: identifying the set of candidate UE beams from a subset of beams used for the set of synchronization signal block measurements.

Aspect 16: The method of aspect 15, wherein the set of candidate UE beams are identified based at least in part on a reference signal received power measurement of the subset of beams used for the set of synchronization signal block measurements.

Aspect 17: The method of any of aspects 15 through 16, wherein the set of candidate UE beams are identified based at least in part on a channel impulse response measurement of the subset of beams used for the set of synchronization signal block measurements.

Aspect 18: The method of any of aspects 15 through 17, wherein the set of candidate UE beams are identified based at least in part on an uplink link budget of the UE.

Aspect 19: The method of any of aspects 1 through 18, wherein the channel state information reference signal is an acquisition channel state information reference signal.

Aspect 20: A method for wireless communication at a UE, comprising: performing a set of synchronization signal block measurements; selecting a serving UE beam and a set of candidate UE beams for measuring a channel state information reference signal based at least in part on the set of synchronization signal block measurements; receiving a threshold number of downlink grants with a demodulation reference signal using the serving UE beam; monitoring one or more wireless channels of a slot using a candidate UE beam from the set of candidate UE beams based at least in part on receiving the threshold number of downlink grants; measuring one or more demodulation reference signals transmitted over the one or more wireless channels of the slot using the candidate UE beam; and transmitting, to an access network entity, a measurement report based at least in part on measuring the one or more demodulation reference signals using the candidate UE beam or a last channel state information reference signal measurement on the serving UE beam, or both.

Aspect 21: The method of aspect 20, wherein measuring the channel state information reference signal comprises: measuring a spectral efficiency or a signal-to-noise ratio, or both, using the candidate UE beam based at least in part on the one or more demodulation reference signals, wherein the measurement report is generated based at least in part on the spectral efficiency or the signal-to-noise ratio, or both.

Aspect 22: An apparatus for wireless communication at a UE, comprising a processor; memory coupled with the processor; and instructions stored in the memory and executable by the processor to cause the apparatus to perform a method of any of aspects 1 through 19.

Aspect 23: An apparatus for wireless communication at a UE, comprising at least one means for performing a method of any of aspects 1 through 19.

Aspect 24: A non-transitory computer-readable medium storing code for wireless communication at a UE, the code comprising instructions executable by a processor to perform a method of any of aspects 1 through 19.

Aspect 25: An apparatus for wireless communication at a UE, comprising a processor; memory coupled with the processor; and instructions stored in the memory and executable by the processor to cause the apparatus to perform a method of any of aspects 20 through 21.

Aspect 26: An apparatus for wireless communication at a UE, comprising at least one means for performing a method of any of aspects 20 through 21.

Aspect 27: A non-transitory computer-readable medium storing code for wireless communication at a UE, the code comprising instructions executable by a processor to perform a method of any of aspects 20 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    performing a set of synchronization signal block measurements;
    selecting a serving UE beam and a set of candidate UE beams for measuring a channel state information reference signal based at least in part on the set of synchronization signal block measurements;
    estimating a set of time resources for the channel state information reference signal based at least in part on one or more previous channel state information reference signal configurations;
    measuring the channel state information reference signal based at least in part on the set of time resources using a candidate UE beam from the set of candidate UE beams;
    determining a slot format for a slot including the set of time resources, wherein the slot format comprises at least one downlink shared channel resource;
    monitoring the slot using the candidate UE beam based at least in part on determining the slot format, wherein the channel state information reference signal is measured based at least in part on monitoring the slot; and
    transmitting, to an access network entity, a measurement report based at least in part on measuring the channel state information reference signal using the candidate UE beam or a last channel state information reference signal measurement on the serving UE beam, or both.

2. The method of claim 1, further comprising:
    measuring a demodulation reference signal on the at least one downlink shared channel resource using the candidate UE beam; and
    performing channel estimation for the slot based at least in part on measuring the demodulation reference signal.

3. The method of claim 1, further comprising:
    using the candidate UE beam for a plurality of slots based at least in part on a time window around the set of time resources, wherein the channel state information reference signal is measured during at least a symbol in the plurality of slots.

4. The method of claim 3, further comprising:
    determining a scheduling variation for the access network entity, wherein the candidate UE beam is used for the plurality of slots based at least in part on the scheduling variation.

5. The method of claim 3, wherein using the candidate UE beam for the plurality of slots comprises:
    using the candidate UE beam for uplink communications and downlink communications during the plurality of slots.

6. The method of claim 1, further comprising:
    monitoring a slot including the set of time resources using the candidate UE beam, wherein the channel state information reference signal is measured on a different symbol of the slot than a predicted symbol for the channel state information reference signal of the set of time resources.

7. The method of claim 1, wherein identifying the set of time resources comprises:
    identifying an aperiodic reference signal resource configuration from the one or more previous channel state information reference signal configurations; and
    determining scheduling information for one or more previous channel state information measurements based at least in part on the aperiodic reference signal resource configuration, wherein the set of time resources is identified based at least in part on the scheduling information.

8. The method of claim 1, wherein measuring the channel state information reference signal comprises:
    measuring a spectral efficiency using the candidate UE beam based at least in part on the channel state information reference signal, wherein the measurement report is generated based at least in part on the spectral efficiency.

9. The method of claim 8, further comprising:
    measuring the spectral efficiency separately for each rank of the candidate UE beam.

10. The method of claim 1, further comprising:
    updating the set of candidate UE beams based at least in part on measuring the channel state information reference signal, additional synchronization signal block measurements, one or more channel state information reference signal measurements using one or more additional candidate UE beams, or any combination thereof.

11. The method of claim 1, further comprising:
    reselecting the serving UE beam based at least in part on measuring the channel state information reference signal.

12. The method of claim 11, wherein reselecting the serving UE beam further comprises:
    performing a filtering, a biasing, a thresholding, or any combination thereof, for a first rank and a second rank of a measurement of the channel state information reference signal, wherein reselection of the serving UE beam is based at least in part on the filtering, the biasing, the thresholding, or any combination thereof.

13. The method of claim 1, wherein identifying the set of candidate UE beams comprises:
    identifying the set of candidate UE beams from a subset of beams used for the set of synchronization signal block measurements.

14. The method of claim 13, wherein the set of candidate UE beams are identified based at least in part on a reference signal received power measurement of the subset of beams used for the set of synchronization signal block measurements.

15. The method of claim 13, wherein the set of candidate UE beams are identified based at least in part on a channel impulse response measurement of the subset of beams used for the set of synchronization signal block measurements.

16. The method of claim 13, wherein the set of candidate UE beams are identified based at least in part on an uplink link budget of the UE.

17. The method of claim 1, wherein the channel state information reference signal is an acquisition channel state information reference signal.

18. An apparatus for wireless communication at a user equipment (UE), comprising:
a processor;
memory coupled with the processor, and
instructions stored in the memory and executable by the processor to cause the apparatus to:
perform a set of synchronization signal block measurements;
select a serving UE beam and a set of candidate UE beams for measuring a channel state information reference signal based at least in part on the set of synchronization signal block measurements;
estimating a set of time resources for the channel state information reference signal based at least in part on one or more previous channel state information reference signal configurations;
measure the channel state information reference signal based at least in part on the set of time resources using a candidate UE beam from the set of candidate UE beams;
determine a slot format for a slot including the set of time resources, wherein the slot format comprises at least one downlink shared channel resource;
monitor the slot using the candidate UE beam based at least in part on determining the slot format, wherein the channel state information reference signal is measured based at least in part on monitoring the slot; and
transmit, to an access network entity, a measurement report based at least in part on measuring the channel state information reference signal using the candidate UE beam or a last channel state information reference signal measurement on the serving UE beam, or both.

19. The apparatus of claim 18, wherein the instructions are further executable by the processor to cause the apparatus to:
measure a demodulation reference signal on the at least one downlink shared channel resource using the candidate UE beam; and
perform channel estimation for the slot based at least in part on measuring the demodulation reference signal.

20. The apparatus of claim 18, wherein the instructions are further executable by the processor to cause the apparatus to:
use the candidate UE beam for a plurality of slots based at least in part on a time window around the set of time resources, wherein the channel state information reference signal is measured during at least a symbol in the plurality of slots.

21. The apparatus of claim 20, wherein the instructions are further executable by the processor to cause the apparatus to:
determine a scheduling variation for the access network entity, wherein the candidate UE beam is used for the plurality of slots based at least in part on the scheduling variation.

22. The apparatus of claim 18, wherein the instructions are further executable by the processor to cause the apparatus to:
monitor a slot including the set of time resources using the candidate UE beam, wherein the channel state information reference signal is measured on a different symbol of the slot than a predicted symbol for the channel state information reference signal of the set of time resources.

23. The apparatus of claim 18, wherein the instructions to identify the set of candidate UE beams are executable by the processor to cause the apparatus to:
identify the set of candidate UE beams from a subset of beams used for the set of synchronization signal block measurements based at least in part on a reference signal received power measurement of the subset of beams used for the set of synchronization signal block measurements, a channel impulse response measurement of the subset of beams used for the set of synchronization signal block measurements, or an uplink link budget of the UE, or any combination thereof.

24. A non-transitory computer-readable medium storing code for wireless communications, the code comprising instructions executable by one or more processors to:
perform a set of synchronization signal block measurements;
select a serving UE beam and a set of candidate UE beams for measuring a channel state information reference signal based at least in part on the set of synchronization signal block measurements;
estimating a set of time resources for the channel state information reference signal based at least in part on one or more previous channel state information reference signal configurations;
measure the channel state information reference signal based at least in part on the set of time resources using a candidate UE beam from the set of candidate UE beams;
determine a slot format for a slot including the set of time resources, wherein the slot format comprises at least one downlink shared channel resource;
monitor the slot using the candidate UE beam based at least in part on determining the slot format, wherein the channel state information reference signal is measured based at least in part on monitoring the slot; and
transmit, to an access network entity, a measurement report based at least in part on measuring the channel state information reference signal using the candidate UE beam or a last channel state information reference signal measurement on the serving UE beam, or both.

25. An apparatus for wireless communication at a user equipment (UE), comprising:
means for performing a set of synchronization signal block measurements;
means for selecting a serving UE beam and a set of candidate UE beams for measuring a channel state information reference signal based at least in part on the set of synchronization signal block measurements;
means for estimating a set of time resources for the channel state information reference signal based at least in part on one or more previous channel state information reference signal configurations;
means for measuring the channel state information reference signal based at least in part on the set of time resources using a candidate UE beam from the set of candidate UE beams;

means for determining a slot format for a slot including the set of time resources, wherein the slot format comprises at least one downlink shared channel resource;

means for monitoring the slot using the candidate UE beam based at least in part on determining the slot format, wherein the channel state information reference signal is measured based at least in part on monitoring the slot; and means for transmitting, to an access network entity, a measurement report based at least in part on measuring the channel state information reference signal using the candidate UE beam or a last channel state information reference signal measurement on the serving UE beam, or both.

* * * * *